(12) United States Patent
Nishimura

(10) Patent No.: US 12,537,425 B2
(45) Date of Patent: Jan. 27, 2026

(54) DRIVE DEVICE FOR ROTATING ELECTRIC MACHINE AND DRIVE METHOD FOR ROTATING ELECTRIC MACHINE

(71) Applicant: Mitsubishi Electric Corporation, Tokyo (JP)

(72) Inventor: Tatsuo Nishimura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 424 days.

(21) Appl. No.: 18/340,215

(22) Filed: Jun. 23, 2023

(65) Prior Publication Data

US 2024/0079935 A1 Mar. 7, 2024

(30) Foreign Application Priority Data

Sep. 7, 2022 (JP) .................... 2022-141880

(51) Int. Cl.
*H02K 11/33* (2016.01)
*H02K 3/28* (2006.01)
*H02P 27/08* (2006.01)

(52) U.S. Cl.
CPC ............... *H02K 11/33* (2016.01); *H02K 3/28* (2013.01); *H02P 27/08* (2013.01); *H02P 2207/05* (2013.01)

(58) Field of Classification Search
CPC ...... H02P 27/08; H02P 2207/05; H02P 25/22; H02P 27/085; H02P 29/662; H02P 21/20; H02P 21/22; H02P 27/12; H02P 21/06; H02P 21/0021; H02K 1/2766; H02K 11/33; H02K 21/14; H02K 3/28
See application file for complete search history.

(56) References Cited

U.S. PATENT DOCUMENTS

2019/0296681 A1   9/2019   Sano

FOREIGN PATENT DOCUMENTS

| JP | 2014107928 A | * | 6/2014 | ............. H02P 21/00 |
| JP | 2019-170098 A | | 10/2019 | |
| JP | 2020-114167 A | | 7/2020 | |

OTHER PUBLICATIONS

"Kajino Hiroki et al., Motor Controller, Jun. 9, 2014, Clarivate Analytics, pp. 1-27" (Year: 2014).*

* cited by examiner

*Primary Examiner* — Antony M Paul
(74) *Attorney, Agent, or Firm* — Sughrue Mion, PLLC

(57) ABSTRACT

A drive device for a rotating electric machine having a stator including a stator winding and a rotor including a permanent magnet includes: a power conversion circuit which outputs a phase current to the stator winding; and a control unit which controls the power conversion circuit. If a phase voltage crest value relative to a voltage of DC power is defined as a modulation factor, the control unit decreases a current amplitude and a current advance angle of the phase current if a temperature of the permanent magnet is higher than a predetermined first threshold-value temperature and the modulation factor is larger than a predetermined threshold value, and increases the current amplitude and the current advance angle of the phase current if the temperature of the permanent magnet is higher than the first threshold-value temperature and the modulation factor is smaller than the threshold value.

11 Claims, 16 Drawing Sheets

DRIVE DEVICE FOR ROTATING ELECTRIC MACHINE AND DRIVE METHOD FOR ROTATING ELECTRIC MACHINE

BACKGROUND OF THE INVENTION

1. Field of the Invention

The present disclosure relates to a drive device for a rotating electric machine and a drive method for a rotating electric machine.

2. Description of the Background Art

In a rotating electric machine having a permanent magnet, when the temperature of the permanent magnet increases and demagnetization occurs, the torque decreases. As control methods for preventing such demagnetization, there are: a control method in which current in the rotating electric machine is reduced according to the temperature of the permanent magnet of the rotating electric machine; and a control method in which a carrier frequency is changed according to said temperature. For example, a technology has been disclosed in which whether or not current flowing through a stator winding is overcurrent is determined according to an estimated temperature of a permanent magnet, and current is limited on the basis of the result of the determination (see, for example, Patent Document 1). In addition, a technology has been disclosed in which synchronization control is performed on a carrier frequency if the temperature of a permanent magnet exceeds a predetermined threshold value (see, for example, Patent Document 2).

Patent Document 1: Japanese Laid-Open Patent Publication No. 2020-114167

Patent Document 2: Japanese Laid-Open Patent Publication No. 2019-170098

However, the conventional control technologies for rotating electric machines have the following problem. That is, no factor in increase in the temperature of the permanent magnet is indicated, and control cannot be performed according to an operation state so as to minimize demagnetization of the permanent magnet, whereby it is impossible to suppress increase of the temperature of the permanent magnet while maintaining a torque.

SUMMARY OF THE INVENTION

The present disclosure has been made to solve the above problem, and an object of the present disclosure is to provide a drive device, for a rotating electric machine, that can suppress increase of the temperature of a permanent magnet while maintaining a torque.

A drive device for a rotating electric machine according to the present disclosure is a drive device for a rotating electric machine having a stator including stator windings for three or more phases and a rotor including a permanent magnet, the drive device including: a power conversion circuit which converts DC power inputted from a power supply and outputs a phase current to each of the stator windings; and a control unit which controls the power conversion circuit. With a phase voltage crest value relative to a voltage of the DC power being defined as a modulation factor, a threshold value is predetermined for the modulation factor. The control unit decreases a current amplitude and a current advance angle of the phase current to be outputted from the power conversion circuit, if a temperature of the permanent magnet is higher than a predetermined first threshold-value temperature and the modulation factor is larger than the threshold value, and increases the current amplitude and the current advance angle of the phase current to be outputted from the power conversion circuit, if the temperature of the permanent magnet is higher than the first threshold-value temperature and the modulation factor is smaller than the threshold value.

In the drive device for the rotating electric machine according to the present disclosure, the control unit decreases the current amplitude and the current advance angle of the phase current to be outputted from the power conversion circuit, if the temperature of the permanent magnet is higher than the predetermined first threshold-value temperature and the modulation factor is larger than the threshold value, and increases the current amplitude and the current advance angle of the phase current to be outputted from the power conversion circuit, if the temperature of the permanent magnet is higher than the first threshold-value temperature and the modulation factor is smaller than the threshold value. Consequently, it is possible to suppress increase of the temperature of the permanent magnet while maintaining a torque.

DETAILED DESCRIPTION OF THE PREFERRED EMBODIMENTS OF THE INVENTION

Figure 1:
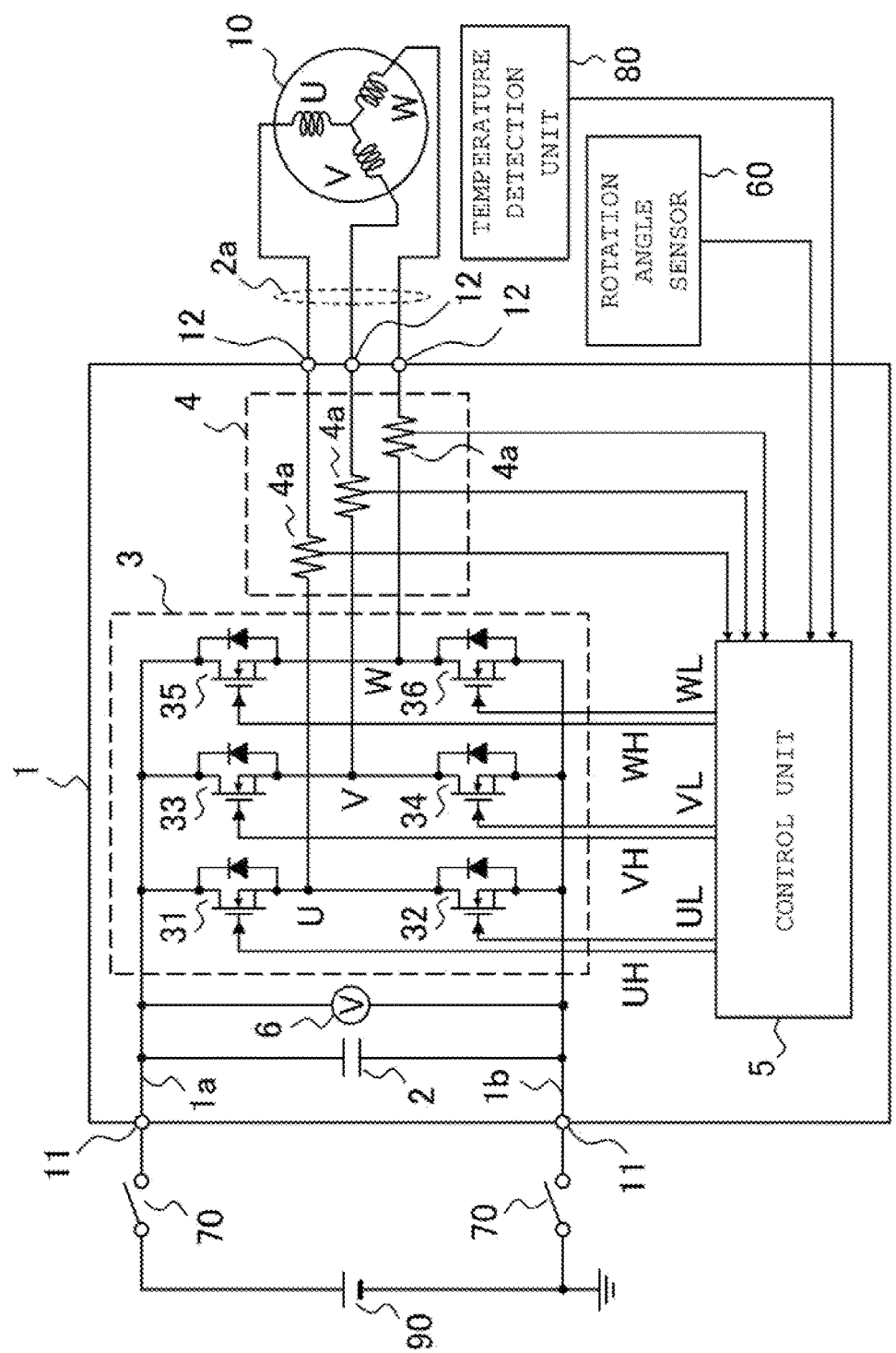
FIG. 1 is a configuration diagram of a drive device for a rotating electric machine according to a first embodiment.

Hereinafter, drive devices for a rotating electric machine according to embodiments for carrying out the present disclosure will be described in detail with reference to the drawings. The same or corresponding components in the drawings are denoted by the same reference characters.

First Embodiment

FIG. 1 is a configuration diagram of a drive device for a rotating electric machine according to a first embodiment. A drive device 1 for a rotating electric machine according to the present embodiment is provided between a DC power supply 90 and a rotating electric machine 10. The DC power supply 90 is a secondary battery that allows charging and discharging. The drive device 1 is connected to the DC power supply 90 by DC busbars 1a and 1b via power switches 70 and input terminals 11 and is connected to the rotating electric machine 10 by AC busbars 2a via output terminals 12. The drive device 1 transmits and receives drive power and regenerative power to and from the rotating electric machine 10.

Figure 2:
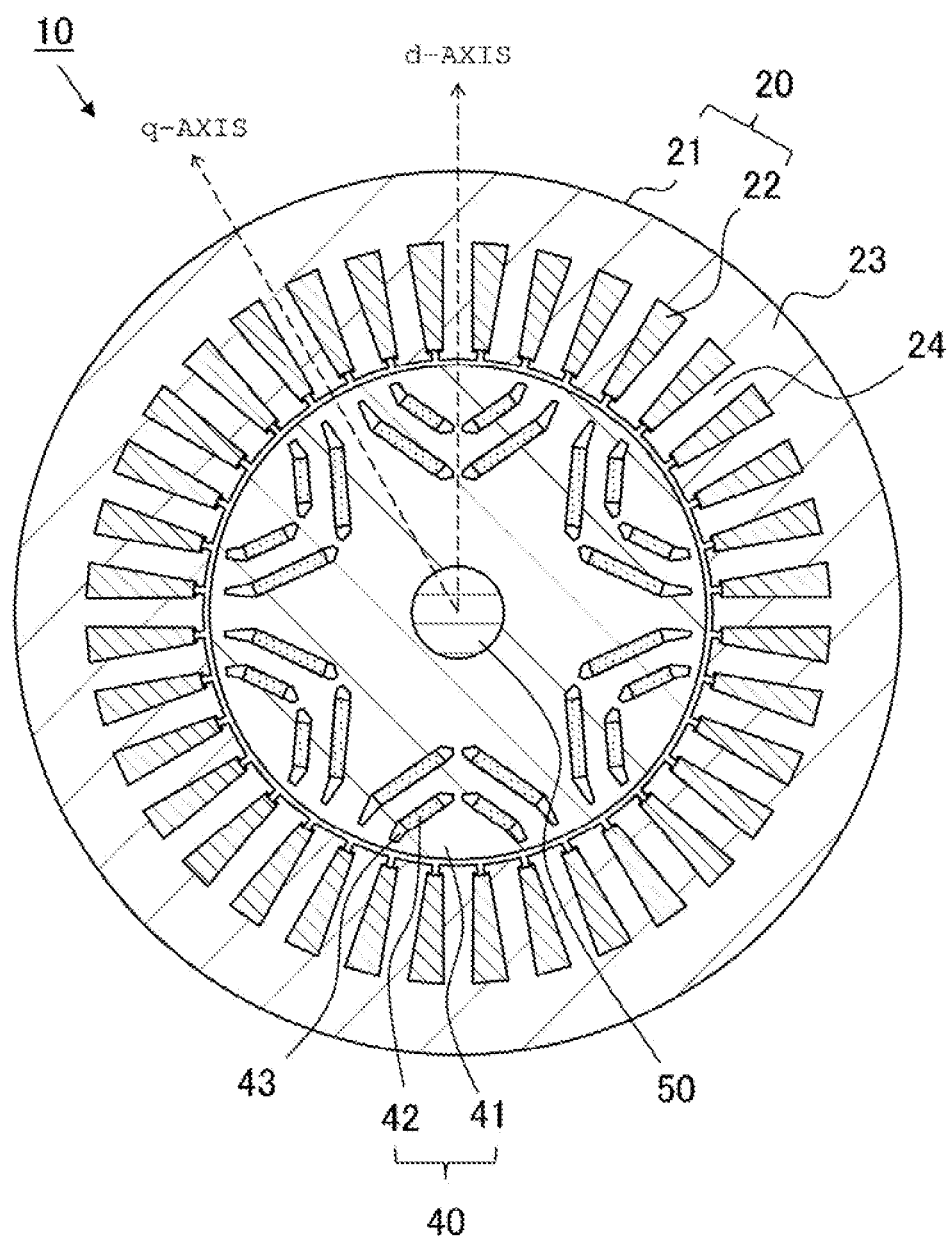
FIG. 2 is a cross-sectional view of the rotating electric machine according to the first embodiment.

FIG. 2 is a cross-sectional view of the rotating electric machine according to the present embodiment. FIG. 2 is a cross-sectional view of the rotating electric machine taken at a plane perpendicular to a rotation axis thereof. The rotating electric machine 10 is composed of an annular stator 20 and a columnar rotor 40 disposed on the inner circumference side relative to the stator 20 with a gap therebetween. A rotation shaft 50 is fixed at the center of the rotor 40. The rotor 40 is supported to be rotatable with respect to the stator 20 via the rotation shaft 50.

The stator 20 is composed of a stator core 21 and stator windings 22. The stator core 21 is composed of an annular core back 23 and teeth 24 protruding from the core back 23 to the inner circumference side. As the teeth 24, thirty-six teeth are disposed at regular intervals in the circumferential direction, and gaps between adjacent ones of the teeth 24 serve as slots. The stator windings 22 are wound around the teeth 24 by making use of the slots. The rotating electric machine 10 according to the present embodiment is a three-phase rotating electric machine, and, as the stator windings 22, windings for three phases, i.e., a U phase, a V phase, and a W phase, are wound through a distributed winding method.

The rotor 40 is composed of a rotor core 41 and permanent magnets 42. The rotor core 41 has magnet insertion holes 43, and the permanent magnets 42 are inserted in the magnet insertion holes 43 so as to be fixed to the rotor core 41. In the rotor 40, four permanent magnets are arranged in two layers each having a V shape toward a circumferentially outer side, to form one magnetic pole. The rotor 40 of the rotating electric machine according to the present embodiment is composed of six such poles.

As shown in FIG. 2, in the rotating electric machine 10, the center direction of magnetic flux generated in one magnetic pole of the rotor 40 is a d-axis, and a direction electrically perpendicular to the d-axis is a q-axis. In the rotating electric machine 10 according to the present embodiment, one magnetic pole is composed of the two layers, and thus a salient pole ratio which is the difference between a d-axis inductance and a q-axis inductance is improved. Therefore, the reluctance torque is increased, and the torque of the rotating electric machine 10 is improved. Meanwhile, if the permanent magnets 42 are arranged in multiple layers which are two layers or more, fluctuation of inductance at the time of rotation of the rotor 40 increases, and thus eddy current generated by each permanent magnet 42 increases. Therefore, the temperature of the permanent magnet 42 increases.

The drive device 1 includes a capacitor 2, a power conversion circuit 3, a current detection unit 4, a control unit 5, and a voltage detection unit 6. The capacitor 2 is connected between the DC busbars 1a and 1b and has: a function of suppressing pulsation of a DC busbar voltage; a function of improving the AC power drive capability of the drive device 1 by decreasing the power supply impedance of the drive device 1; a function of absorbing surge voltage inputted from outside; and the like. The voltage detection unit 6 detects the voltage between the DC busbars 1a and 1b as a DC busbar voltage.

The power conversion circuit 3 is an inverter circuit in which six switching elements are connected in a full-bridge configuration. As shown in FIG. 1, two switching elements 31 and 32 are connected in series to each other, two switching elements 33 and 34 are connected in series to each other, two switching elements 35 and 36 are connected in series to each other, and these series-connection pairs are connected in parallel between the DC busbars 1a and 1b. In addition, from an intermediate point between the switching elements 31 and 32, an output is given to a stator winding for the U phase in the rotating electric machine 10. From an intermediate point between the switching elements 33 and 34, an output is given to a stator winding for the V phase in the rotating electric machine 10. From an intermediate point between the switching elements 35 and 36, an output is given to a stator winding for the W phase in the rotating electric machine 10. The AC busbars 2a are formed by three electrical paths through which outputs are given to the stator windings for the U phase, the V phase, and the W phase. Here, the switching elements 31, 33, and 35 connected to the DC busbar 1a are referred to as upper-stage-side switching elements, and the switching elements 32, 34, and 36 connected to the DC busbar 1b are referred to as lower-stage-side switching elements.

As the switching elements 31 to 36, for example, metal oxide semiconductor field effect transistors (MOSFETs) such as ones shown in FIG. 1 are used. As the switching elements 31 to 36, switching elements other than MOSFETs, e.g., insulated gate bipolar transistors (IGBTs) or the like, can also be used. As shown in FIG. 1, a free wheel diode (FWD) is provided in parallel to each of the MOSFETs serving as the switching elements 31 to 36, with a direction from the negative side toward the positive side of the DC power supply 90, i.e., a direction from the lower-stage side toward the upper-stage side, being defined as a forward direction.

The current detection unit 4 detects currents flowing through the three AC busbars 2a, converts each of the currents into a voltage, and outputs current information about the rotating electric machine to the control unit 5. As shown in FIG. 1, the current detection unit 4 has shunt resistors 4a connected in series to the respective AC busbars 2a. The current detection unit 4 detects currents flowing through the respective AC busbars 2a by using the shunt resistors 4a. Alternatively, the current detection unit 4 may be implemented by a current sensor in which a magnetic sensor such as a Hall element is used. Currents flowing through the respective AC busbars 2a are currents flowing in the U phase, the V phase, and the W phase of stator windings, and thus the current detection unit 4 detects a U-phase current, a V-phase current, and a W-phase current.

Each of the power switches 70 is for controlling transmission and reception of power between the DC power supply 90 and the drive device 1. The power switch 70 is ordinarily in a closed state. The power switch 70 is controlled to enter an opened state by a higher-order system if, for example, the value of the voltage of the DC power supply 90 becomes equal to or larger than a setting value at the time of regenerative operation of the rotating electric machine 10, the value of the voltage of the DC power supply 90 becomes equal to or smaller than the setting value owing to wearing of the DC power supply 90 or the like, or the value of current flowing through the DC power supply 90 becomes equal to or larger than a setting value. Here, if, for example, the rotating electric machine is used as a device in a drive system of a vehicle, the higher-order system refers to an electronic control unit (ECU) of the vehicle. Alternatively, the power switch 70 may be configured to be controlled by the control unit 5 of the drive device 1.

The rotating electric machine 10 includes a rotation angle sensor 60 and a temperature detection unit 80. The rotation angle sensor 60 detects a rotation angle of the rotor 40 and outputs information about the rotation angle to the control unit 5. The temperature detection unit 80 detects a temperature of the permanent magnet 42 and outputs information about the temperature to the control unit 5. As the rotation angle sensor 60, a resolver, an encoder, a magnetic sensor, or the like can be used. The temperature of the permanent magnet can be detected by using a thermocouple or the like. If the rotor is mounted with the thermocouple, a slip ring may be used. If no slip ring is used, a signal from the thermocouple is acquired as a radio signal, whereby the temperature of the permanent magnet can be detected. When the temperature of the permanent magnet changes, the magnetic force of the permanent magnet changes, and thus the induced voltage of the rotating electric machine also changes. It is also possible to prestore the correspondence relationship between the induced voltage of the rotating electric machine and the temperature of the permanent magnet, and estimate a temperature of the permanent magnet from the induced voltage of the rotating electric machine.

Figure 3:
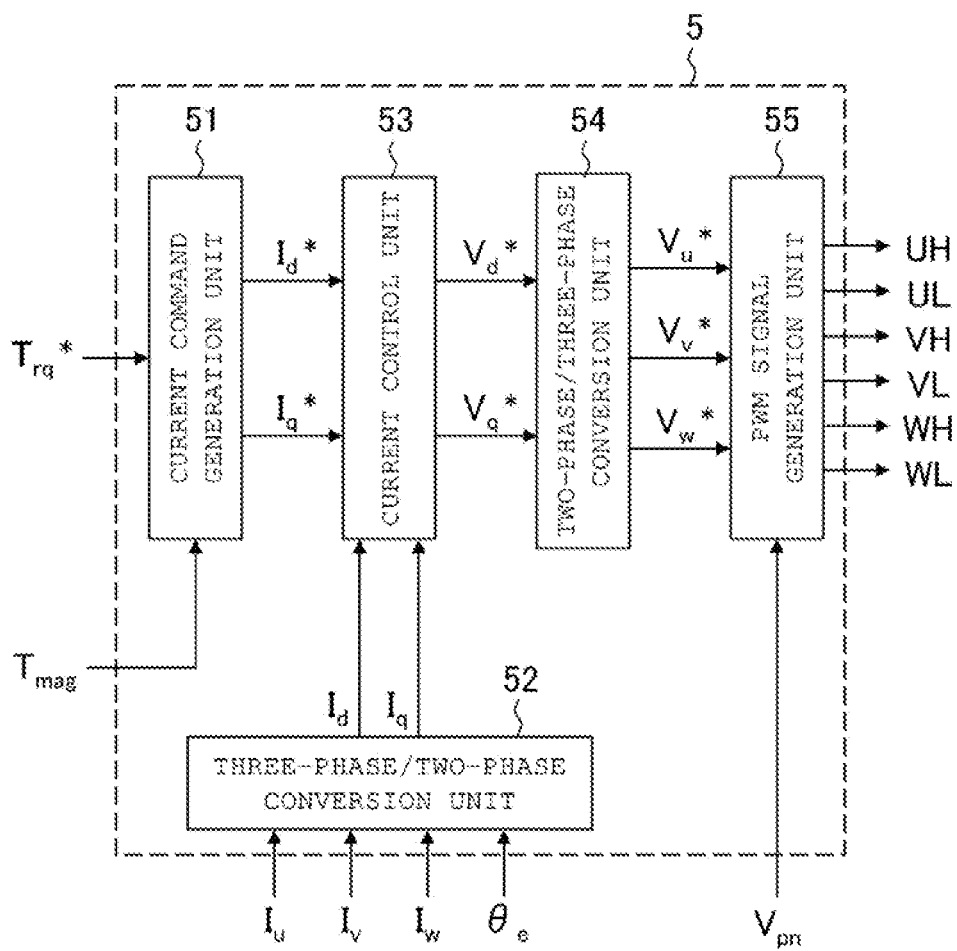
FIG. 3 is a block configuration diagram of a control unit according to the first embodiment.

FIG. 3 is a block configuration diagram of the control unit according to the present embodiment. As shown in FIG. 3, the control unit 5 in the present embodiment is composed of a current command generation unit 51, a three-phase/two-phase conversion unit 52, a current control unit 53, a two-phase/three-phase conversion unit 54, and a pulse width modulation (PWM) signal generation unit 55.

The current command generation unit 51 receives: a torque command $T_{rq}^*$ outputted from the higher-order system; and a permanent magnet temperature T mag outputted from the temperature detection unit 80. The current command generation unit 51 generates a d-axis current command value $I_d^*$ and a q-axis current command value $I_q^*$ for controlling the rotating electric machine 10 through vector control. Here, the d-axis current command value $I_d^*$ is a current for controlling magnetic flux generated in the d-axis, and the q-axis current command value $I_q^*$ is a current for controlling magnetic flux generated in the q-axis. The current command generation unit 51 outputs, to the current control unit 53, the d-axis current command value $I_d^*$ and the q-axis current command value $I_q^*$ which have been generated.

As described later, in the drive device for the rotating electric machine according to the present embodiment, a current amplitude and a current advance angle are controlled according to a modulation factor if the permanent magnet temperature is higher than a threshold-value temperature. The d-axis current and the q-axis current can be calculated from the current amplitude and the current advance angle. The current command generation unit 51 may have a plurality of current command maps, for torque commands, that have been created in advance by means of actual measurement or simulations.

The three-phase/two-phase conversion unit 52 receives: a U-phase current $I_u$, a V-phase current $I_v$, and a W-phase current $I_w$ detected by the current detection unit 4; and an electrical angle $\theta_e$ which is the rotation angle, of the rotating electric machine 10, detected by the rotation angle sensor 60. The three-phase/two-phase conversion unit 52 converts the U-phase current $I_u$, the V-phase current $I_v$, and the W-phase current $I_w$ into a d-axis current detection value $I_d$ and a q-axis current detection value $I_q$ through three-phase/two-phase coordinate transformation by using the electrical angle $\theta_e$. The three-phase/two-phase conversion unit 52 outputs, to the current control unit 53, the d-axis current detection value $I_d$ and the q-axis current detection value $I_q$ which have been obtained by the conversion.

The current control unit 53 receives the d-axis current command value $I_d^*$ and the q-axis current command value $I_q^*$ from the current command generation unit 51 and receives the d-axis current detection value $I_d$ and the q-axis current detection value $I_q$ from the three-phase/two-phase conversion unit 52. The current control unit 53 calculates a d-axis current deviation obtained from the difference between the d-axis current command value $I_d^*$ and the d-axis current detection value $I_d$, and a q-axis current deviation obtained from the difference between the q-axis current command value $I_q^*$ and the q-axis current detection value $I_q$, and calculates a d-axis voltage command value $V_d^*$ and a q-axis voltage command value $V_q^*$ by performing proportional-integral control calculation on the respective current deviations. The current control unit 53 outputs, to the two-phase/three-phase conversion unit 54, the d-axis voltage command value $V_d^*$ and the q-axis voltage command value $V_q^*$ which have been obtained by the calculation.

The two-phase/three-phase conversion unit 54 receives the d-axis voltage command value $V_d^*$ and the q-axis voltage command value $V_q^*$ from the current control unit 53. The two-phase/three-phase conversion unit 54 calculates three-phase voltage command values $V_u^*$, $V_v^*$, and $V_w^*$ in a coordinate system at rest on the basis of the d-axis voltage command value $V_d^*$ and the q-axis voltage command value $V_q^*$. The two-phase/three-phase conversion unit 54 outputs, to the PWM signal generation unit 55, the three-phase voltage command values $V_u^*$, $V_v^*$, and $V_w^*$ which have been obtained by the calculation.

The PWM signal generation unit 55 receives the three-phase voltage command values $V_u^*$, $V_v^*$, and $V_w^*$ from the two-phase/three-phase conversion unit 54 and receives a DC busbar voltage $V_{pn}$ from the voltage detection unit 6. The PWM signal generation unit 55 calculates ON/OFF control signals UH, UL, VH, VL, WH, and WL for the respective switching elements of the power conversion circuit 3 on the basis of the three-phase voltage command values $V_u^*$, $V_v^*$, and $V_w^*$ and the DC busbar voltage $V_{pn}$. The PWM signal generation unit 55 outputs, to the respective switching elements of the power conversion circuit 3, the ON/OFF control signals UH, UL, VH, VL, WH, and WL which have been obtained by the calculation.

The switching elements 31 to 36 of the power conversion circuit 3 are operated to be turned on/off according to the ON/OFF control signals UH, UL, VH, VL, WH, and WL from the control unit 5, respectively. The drive device 1, for the rotating electric machine, which is thus configured converts DC power inputted from the DC power supply 90 into AC power and supplies the AC power to the rotating electric machine 10. Further, the drive device 1 charges the DC power supply 90 with regenerative power generated in a state where the rotating electric machine 10 is performing regenerative operation.

Figure 4:
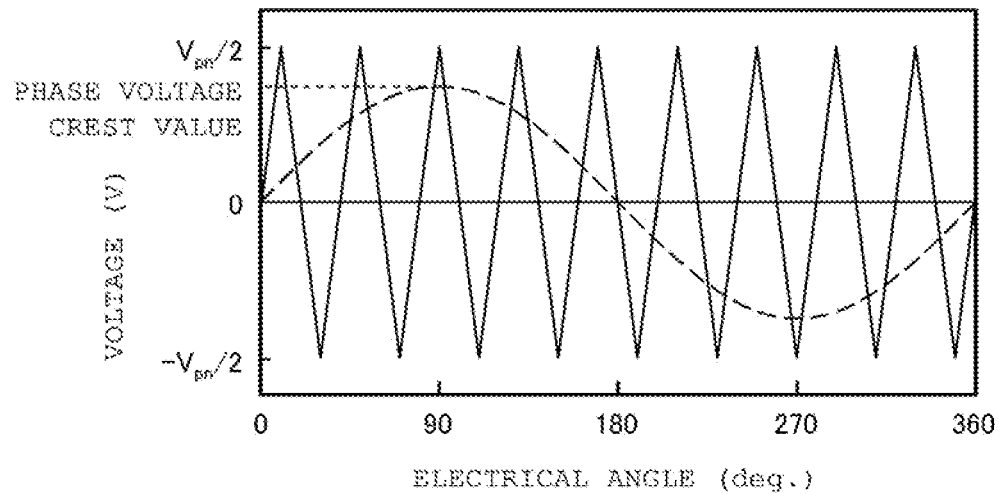
FIG. 4 is a schematic diagram showing a modulation factor defined through comparison between a triangular wave and a sine wave, in the first embodiment.

FIG. 4 is a schematic diagram showing a modulation factor defined through comparison between a triangular wave and a sine wave, in the present embodiment. The difference between the maximum value and the minimum value of the triangular wave is the DC busbar voltage $V_{pn}$, and an amplitude which is the difference from 0 V is $V_{pn}/2$. Meanwhile, the sine wave is a phase voltage of the rotating electric machine. Here, the modulation factor is defined as the phase voltage crest value of the rotating electric machine relative to the amplitude of the triangular wave. That is, the expression "modulation factor=phase voltage crest value of rotating electric machine/($V_{pn}/2$)" is satisfied. In order not to allow the phase voltage crest value of the rotating electric machine to exceed the voltage of the DC power supply, the modulation factor needs to be 1 or smaller. However, no problem arises even if the modulation factor is set to be 1 or larger. If the modulation factor is set to be 1 or larger, the ON period is elongated in ON/OFF control for each of the switching elements. Therefore, the effective value of the voltage to be applied to the rotating electric machine increases, and the output of the rotating electric machine increases. Without limitation to the case where the sine wave is only a fundamental wave, a case where a third-order harmonic is superimposed is also included.

Figure 5:
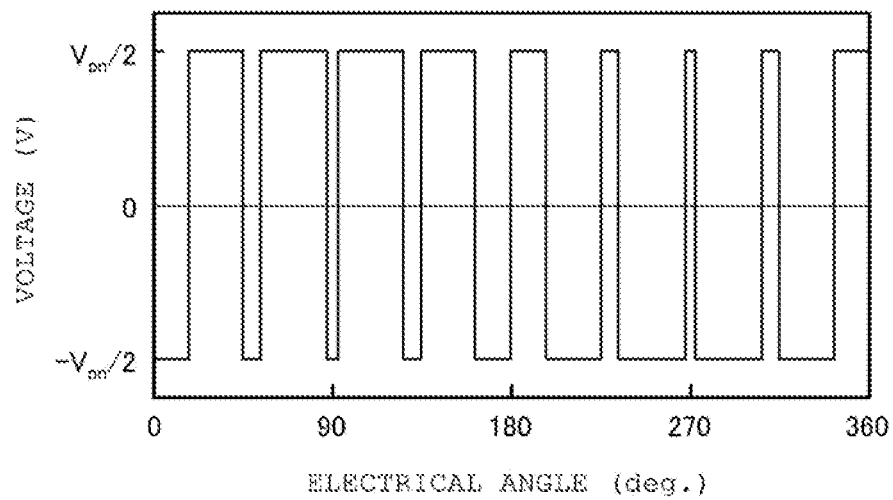
FIG. 5 is a schematic diagram of a rectangular wave phase voltage outputted through comparison between the triangular wave and the sine wave, in the first embodiment.

FIG. 5 is a schematic diagram of a rectangular wave phase voltage outputted through comparison between the triangular wave and the sine wave. The rectangular wave phase voltage is outputted through comparison between the triangular wave and the sine wave in FIG. 4. When the triangular wave has a larger value than the sine wave, $-V_{pn}/2$ is outputted. Meanwhile, when the triangular wave has a smaller value than the sine wave, $V_{pn}/2$ is outputted. Therefore, the difference between the maximum value and the minimum value of the rectangular wave phase voltage is $V_{pn}$. Thus, the difference is equal to the DC busbar voltage $V_{pn}$, i.e., the voltage of the DC power supply. In PWM signal generation, a pulse width of the rectangular wave is adjusted, whereby the effective value of voltage to be outputted is changed. Here, the frequency for one cycle of the triangular wave is defined as a carrier frequency $f_c$. The carrier frequency is a frequency higher than the frequency of the sine wave. For example, if the maximum rotation speed of the rotating electric machine is 20000 rpm, since the number of poles of the rotating electric machine in the present embodiment is six, the frequency of the sine wave is 1 kHz at most, and a frequency of 1 kHz or higher is selected as the carrier frequency. Drive can be performed even in the case of setting the frequency of the sine wave and the carrier frequency to be equal to each other. However, if the carrier frequency is sufficiently higher than the frequency of the sine wave, a harmonic component included in a phase current of the rotating electric machine decreases to a greater extent. In the case of a drive device used for an electrified vehicle, the frequency of the sine wave is about several Hz to 1 kHz, and the carrier frequency is about 1 kHz to 10 kHz. However, as described later, if a semiconductor switching element made of silicon carbide (SiC) is used as each of the switching elements that compose the power conversion circuit, the carrier frequency can be increased to be 10 kHz or higher. The DC busbar voltage $V_{pn}$ is also the output voltage of the DC power supply 90. For example, if the drive device for the rotating electric machine according to the present embodiment is used for an electrified vehicle, the DC busbar voltage $V_{pn}$ is the DC voltage of a battery. If the battery is a lead storage battery, the DC busbar voltage $V_{pn}$ is about 12 V to 48 V. Meanwhile, if the battery is a nickel-hydrogen battery, a lithium-ion battery, or the like, the DC busbar voltage $V_{pn}$ is about 200 V to 400 V.

Figure 6:
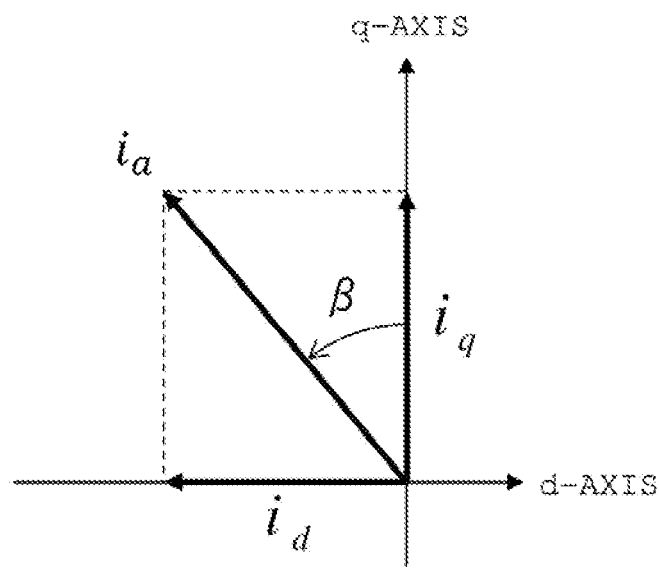
FIG. 6 shows definitions of a current amplitude and a current advance angle in the first embodiment.

FIG. 6 shows definitions of the current amplitude and the current advance angle. $i_a$ is the vector sum of the vector of the d-axis current $i_d$ and the vector of the q-axis current $i_q$. If the effective value of the phase current is defined as $i_e$, $i_e$ is a value obtained by dividing the magnitude of $i_a$ by $\sqrt{3}$. That is, the expression "$i_e = \sqrt{(i_d^2 + i_q^2)}/\sqrt{3}$" is satisfied. The current amplitude is defined as the effective value $i_e$ of the phase current. A current advance angle $\beta$ is defined as the advance angle of $i_a$ relative to the q-axis current $i_q$.

Figure 7:
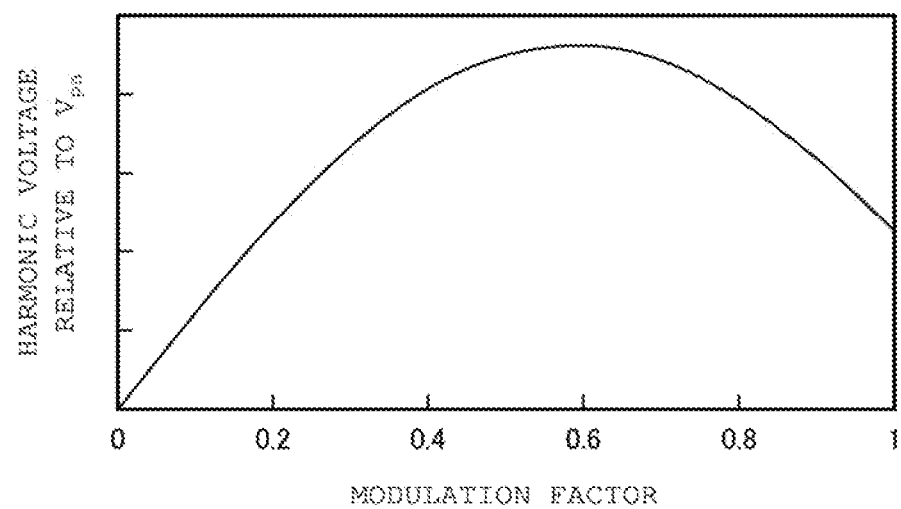
FIG. 7 is a characteristic graph showing the relationship between the modulation factor and harmonic voltage relative to DC busbar voltage, in the first embodiment.

FIG. 7 is a characteristic graph showing the relationship between the modulation factor and harmonic voltage relative to the DC busbar voltage $V_{pn}$. If the waveform of the rectangular wave phase voltage shown in FIG. is subjected to degree decomposition through Fourier transform, a harmonic component other than a fundamental wave is included in the rectangular wave phase voltage. A harmonic in the waveform of the rectangular wave phase voltage obtained through comparison between the sine wave and the triangular wave includes a sideband wave component having a frequency that is an integer multiple of the carrier frequency $f_c$. If the fundamental wave frequency of the sine wave is defined as f, representative frequency components of the harmonic included in the waveform of the rectangular wave phase voltage include components having frequencies of $f_c \pm 2f$, $2f_c \pm f$, $3f_c \pm 2f$, $4f_c \pm f$, and the like. The magnitude of each harmonic component is calculated by using a Bessel function, and the $2f_c \pm f$ component increases with respect to any modulation factor. FIG. 7 shows the proportion of the $2f_c \pm f$ component included in the DC busbar voltage $V_{pn}$, and the proportion becomes maximum around a modulation factor of 0.6.

Figure 8:
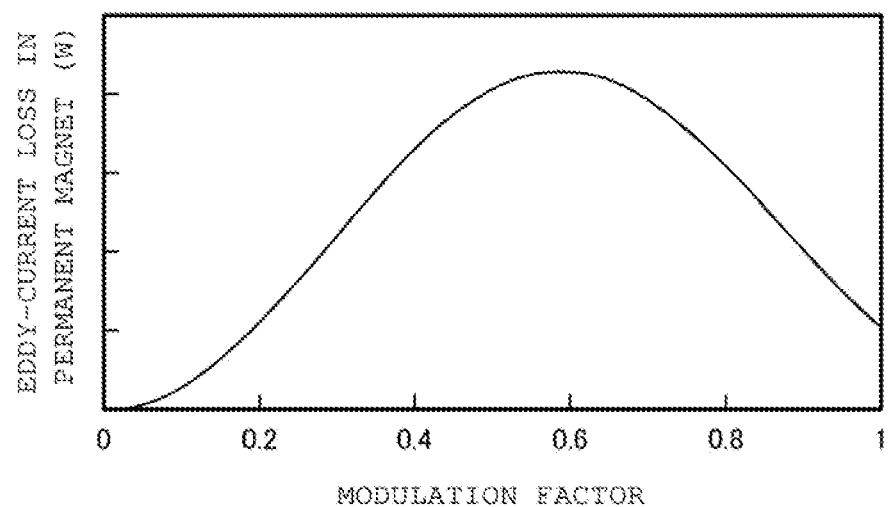
FIG. 8 is a characteristic graph showing the relationship between the modulation factor and eddy-current loss in a permanent magnet, in the first embodiment.

FIG. 8 is a characteristic graph showing the relationship between the modulation factor and eddy-current loss in the permanent magnet. The $2f_c \pm f$ component is dominant as a frequency component of the harmonic voltage included in the waveform of the rectangular wave phase voltage, and thus a focus is placed on the $2f_c \pm f$ component as the frequency component of the harmonic voltage with respect to the modulation factor. Each current flowing through the rotating electric machine has a value obtained by dividing an applied voltage by the resistance of the corresponding stator winding in the rotating electric machine. Therefore, if a harmonic component is included in the voltage applied to the rotating electric machine, a frequency component of the same harmonic as the voltage is included also in the current flowing through the rotating electric machine. A magnetic flux generated by the stator winding in the rotating electric machine is calculated according to the product of the inductance and the current of the rotating electric machine. Therefore, a harmonic component of the magnetic flux generated from the stator winding in the rotating electric machine is also the same as the harmonic component of the voltage. That is, the $2f_c \pm f$ component is dominant also as the harmonic component of the magnetic flux generated from the stator winding in the rotating electric machine. In a synchronous rotating electric machine in which a permanent magnet is embedded in a rotor, rotation is performed in synchronization with a fundamental wave component of a magnetic flux generated from a stator winding of a stator, and thus loss in the permanent magnet of the rotor generated owing to the fundamental wave component of the magnetic flux generated from the stator winding of the stator is minute.

Eddy-current loss generated owing to a temporal change in a magnetic flux interlinking with the permanent magnet of the rotor is dominant as the loss in the permanent magnet of the rotor. The eddy-current loss in the permanent magnet of the rotor is generated by a harmonic component of the magnetic flux that is not synchronous with the rotation speed of the rotor. The eddy-current loss in the permanent magnet is generated so as to have a value that is the square of a time derivative of the magnetic flux, and thus the frequency component of the eddy-current loss in the permanent magnet and the frequency component of the magnetic flux generated from the stator winding in the rotating electric machine are different from each other. If the frequency of the harmonic component of the magnetic flux generated from the stator winding in the rotating electric machine is $2f_c \pm f$, the frequency component of the eddy-current loss in the permanent magnet has a frequency of $2f_c$, $4f_c$, or the like. The $2f_c$ component of the eddy-current loss in the permanent magnet is calculated according to the sum of the products of trigonometric functions of the harmonic frequency $2f_c \pm f$ and a fundamental wave frequency f of the magnetic flux. Meanwhile, the $4f_c$ component of the eddy-current loss in the permanent magnet is calculated according to the sum of the products of harmonic frequencies $2f_c + f$ and $2f_c - f$ in the magnetic flux.

The eddy-current loss in the permanent magnet is calculated according to the square of the time derivative of the magnetic flux, and thus a higher frequency of the harmonic of the magnetic flux leads to infliction of a more significant influence on the eddy-current loss in the permanent magnet. Therefore, regarding the eddy-current loss in the permanent magnet, the $4f_c$ component is a more dominant component in the eddy-current loss than the $2f_c$ component. FIG. 8 is a characteristic graph showing the $4f_c$ component of the eddy-current loss in the permanent magnet with respect to the modulation factor. The temperature of the permanent magnet increases owing to the eddy-current loss, and thus the eddy-current loss only has to be decreased in order to decrease the temperature of the permanent magnet. Here, as shown in FIG. 8, the eddy-current loss changes according to the modulation factor, and thus the current amplitude and the current advance angle only have to be controlled according to the modulation factor in order to decrease the temperature of the permanent magnet when the temperature of the permanent magnet is higher than the threshold-value temperature. That is, the temperature of the permanent magnet can be decreased by controlling the current amplitude and the current advance angle according to the modulation factor such that the eddy-current loss is decreased.

As shown in FIG. 8, the eddy-current loss in the permanent magnet becomes maximum around a modulation factor of 0.6. As shown in FIG. 8, if the modulation factor is smaller than 0.6, the eddy-current loss decreases as the modulation factor decreases, and meanwhile, if the modulation factor is larger than 0.6, the eddy-current loss decreases as the modulation factor increases. Here, the modulation factor of 0.6 at which the eddy-current loss becomes maximum is defined as a threshold value. Judging from above, control only has to be performed as follows in order to decrease the eddy-current loss. That is, if the modulation factor is smaller than the threshold value, the current amplitude and the current advance angle are controlled so as to cause the modulation factor to be even smaller, and meanwhile, if the modulation factor is larger than the threshold value, the current amplitude and the current advance angle are controlled so as to cause the modulation factor to be even larger.

For generation of a rectangular wave phase voltage of PWM, there are a plurality of methods other than the method for generating a rectangular wave phase voltage through comparison between a triangular wave and a sine wave. For example, the methods include: a method in which a sawtooth wave is used instead of the triangular wave; a method in which a waveform having a third-order harmonic component superimposed is used instead of the sine wave; and the like. In each of the methods, the proportion of the harmonic voltage to be applied to the rotating electric machine changes according to the modulation factor. Considering this, a threshold value of the modulation factor is set so as to adapt to the methods, and the current amplitude and the current advance angle are controlled according to the threshold value.

Figure 9:
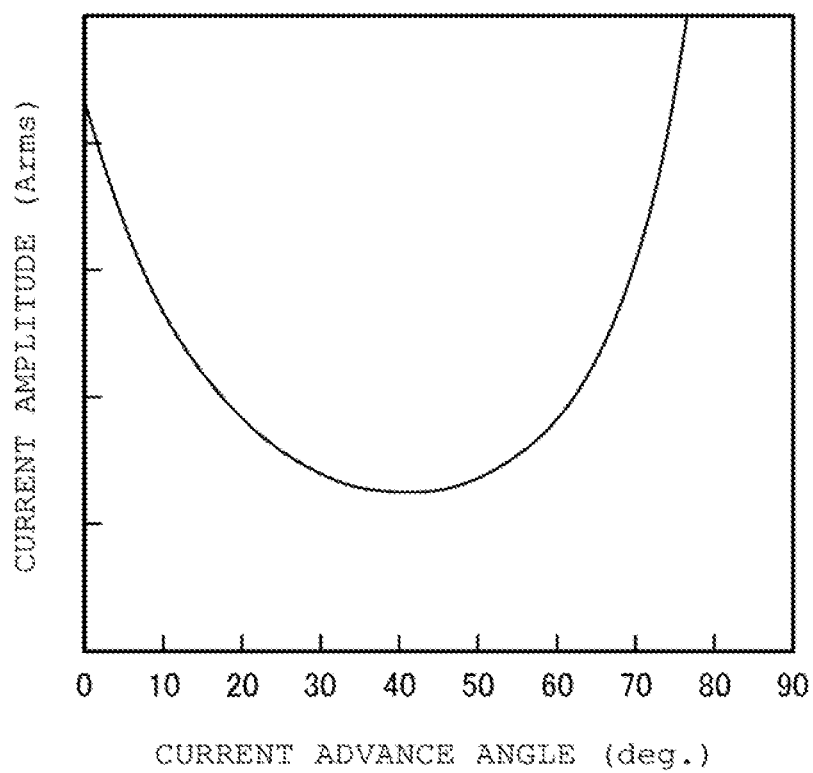
FIG. 9 is a characteristic graph showing the relationship between the current advance angle and the current amplitude, in the rotating electric machine according to the first embodiment.

FIG. 9 is a characteristic graph showing the relationship between the current advance angle and the current amplitude for obtaining the same torque, in the rotating electric machine according to the present embodiment. FIG. 9 shows characteristics in the rotating electric machine shown in FIG. 2 in which the stator windings are wound through a distributed winding method and in which the permanent magnet is embedded in the rotor. In this type of rotating electric machine, a reluctance torque is more dominant than a magnet torque, and thus the current amplitude for obtaining the same torque becomes minimum in a range in which the current advance angle is 40 to 50 degrees. Meanwhile, in a rotating electric machine in which the stator windings are wound through a concentrated winding method, the magnet torque is more dominant, and thus the current advance angle at which the current amplitude for obtaining the same torque becomes minimum is smaller than that in the rotating electric machine in which the distributed winding method is employed. Further, in a surface-magnet-type rotating electric machine in which a permanent magnet is pasted on the surface of a rotor, only the magnet torque is generated, and thus the current advance angle at which the current amplitude for obtaining the same torque becomes minimum is 0 degrees. In any type of rotating electric machine, when the current amplitude and the current advance angle are controlled according to the modulation factor, the current amplitude and the current advance angle are controlled while the same torque is maintained as shown in FIG. 9. Consequently, it is possible to suppress increase of the temperature of the permanent magnet while maintaining the torque.

Figure 10:
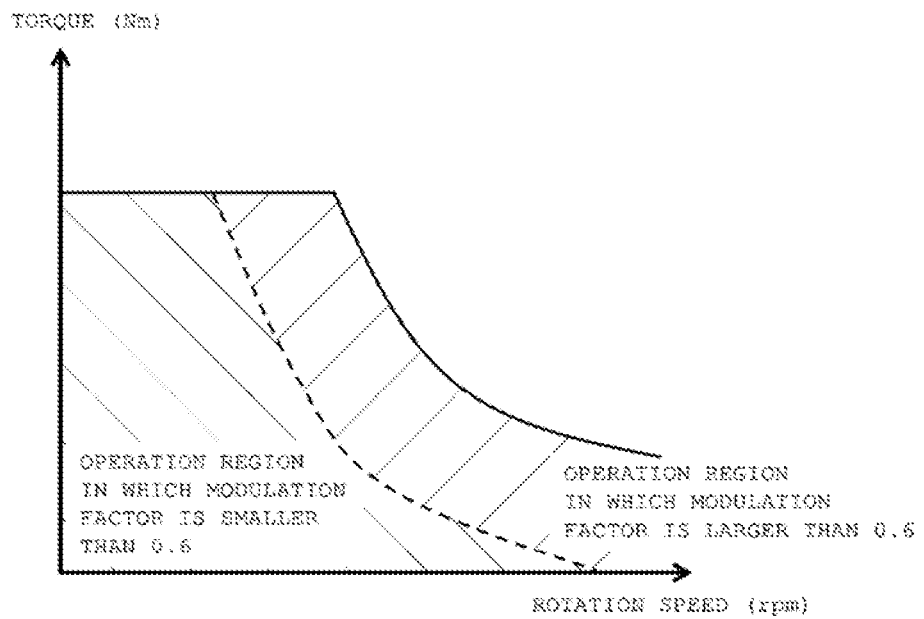
FIG. 10 shows switching across a modulation factor of 0.6 in the relationship between rotation speed and torque, in the first embodiment.

FIG. 10 shows switching across a modulation factor of 0.6 in the relationship between rotation speed and torque. In FIG. 10, the horizontal axis represents rotation speed, and the vertical axis represents torque. A solid line shown in FIG. 10 indicates a relationship between rotation speed and torque, at which the modulation factor is 1 and at which the maximum output is obtained. A case is assumed in which the rotating electric machine according to the present embodiment is used as a rotating electric machine for a main engine of an electrified vehicle. On this assumption, each of the rotation speed and the torque is used in a wide range. In this case, the modulation factor in the relationship between the rotation speed and the torque needs to be ascertained. The modulation factor is, as described in relation to the definition thereof with reference to FIG. 4, defined as the phase voltage crest value of the rotating electric machine relative to the amplitude of the triangular wave. In this case, regarding the phase voltage crest value, a higher speed causes a higher induced voltage to be generated in the rotating electric machine, and thus, if the rotation speed increases, the modulation factor also increases. In addition, if the torque increases, the current flowing through the rotating electric machine increases, and thus the voltage generated in the rotating electric machine also increases and the modulation factor also increases. As shown in FIG. 8, the tendency of the eddy-current loss in the permanent magnet changes at a boundary at which the modulation factor is 0.6. In the characteristics regarding the rotation speed and the torque, the line on which the modulation factor is 0.6 is indicated by a broken line in FIG. 10.

In FIG. 10, definition is made such that the modulation factor is 1 on the maximum output line on which the maximum output is obtained. Thus, the line on which the modulation factor is 0.6 is located on the low-rotation-speed side relative to the maximum output line. It is noted that the maximum output can be improved by setting the modulation factor to be 1 or larger. The drive device for the rotating electric machine according to the present embodiment is such that: in an operation region regarding the rotation speed and the torque (shown in FIG. 10) in which the modulation factor is smaller than 0.6, the current amplitude and the current advance angle are controlled so as to cause the modulation factor to be even smaller; and, in an operation region regarding the rotation speed and the torque (shown in FIG. 10) in which the modulation factor is larger than 0.6, the current amplitude and the current advance angle are controlled so as to cause the modulation factor to be even larger. Therefore, the drive device for the rotating electric machine according to the present embodiment is applicable not only to a specific operation point regarding the rotation speed and the torque but also to a wide range of operation points regarding the rotation speed and the torque, whereby the eddy-current loss in the permanent magnet can be reduced in a wide range of operation points.

Figure 11:
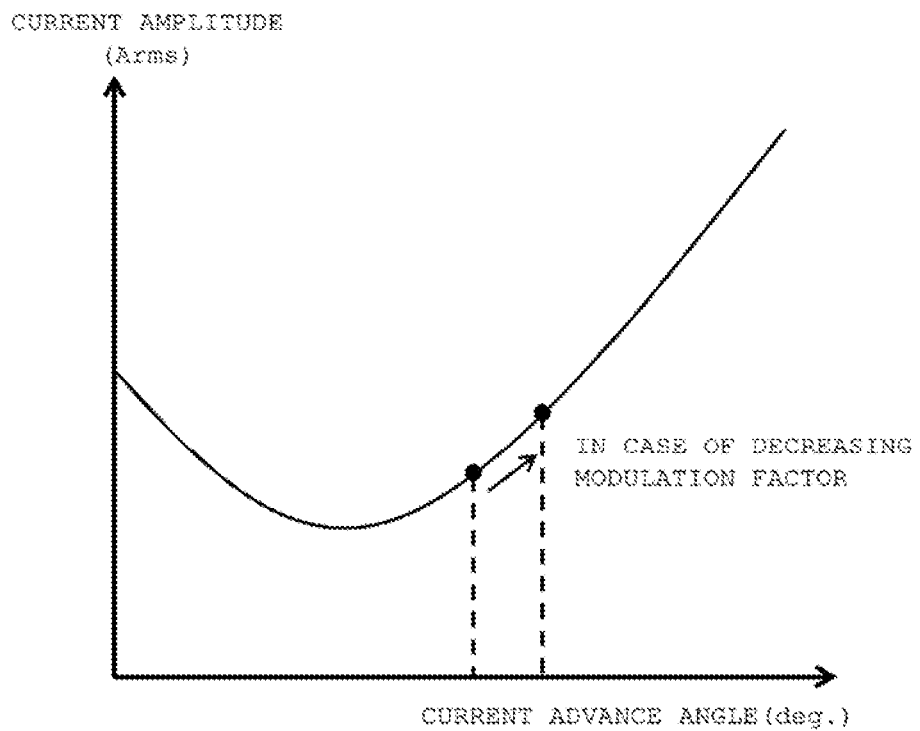
FIG. 11 shows control of the current amplitude and the current advance angle in the case of decreasing the modulation factor, in the first embodiment.
Figure 12:
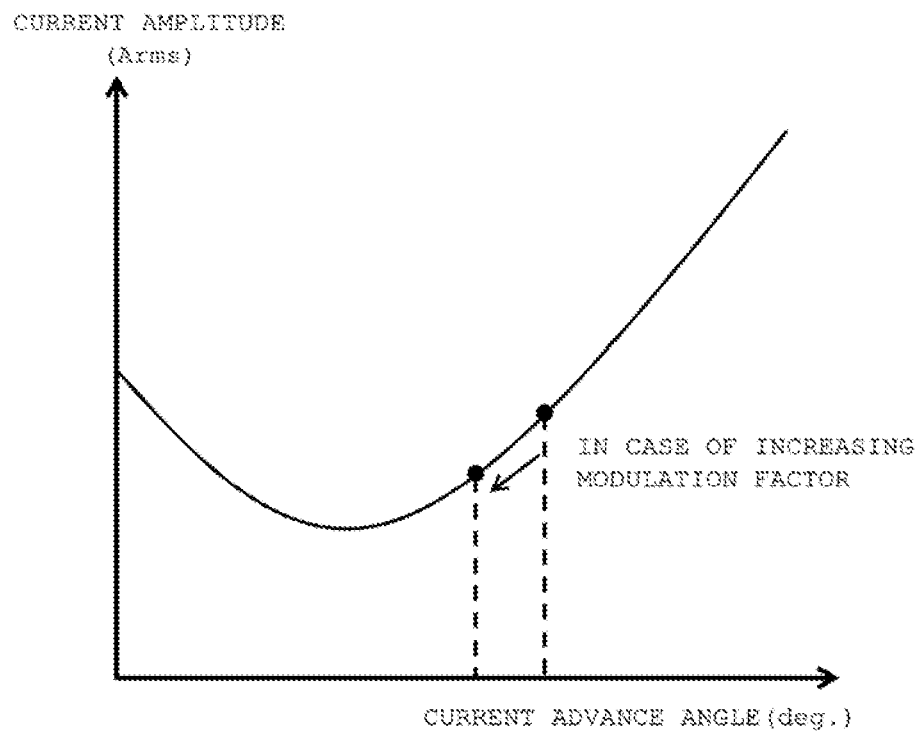
FIG. 12 shows control of the current amplitude and the current advance angle in the case of increasing the modulation factor, in the first embodiment.

FIG. 11 shows control of the current amplitude and the current advance angle in the case of decreasing the modulation factor, in the present embodiment. FIG. 12 shows control of the current amplitude and the current advance angle in the case of increasing the modulation factor, in the present embodiment. In each of FIG. 11 and FIG. 12, a solid line indicates the current amplitude for obtaining the same torque, with respect to the current advance angle. Ordinary control of the rotating electric machine involves use of current advance angles within a range of equal to or larger than a current advance angle at which the current amplitude for obtaining the same torque becomes minimum. That is, since increase in the current advance angle leads to mitigation of magnetic saturation and decrease of iron loss in the rotating electric machine, the current advance angles within the range of equal to or larger than the current advance angle at which the current amplitude for obtaining the same torque becomes minimum, are used. Here, increase in the current advance angle leads to exhibition of an effect of weakening a magnetic flux generated from the permanent magnet.

The phase voltage crest value of the rotating electric machine is dependent on the product of the rotational angular velocity and the magnetic flux of the rotating electric machine. Thus, if the current advance angle is increased, the magnetic flux of the rotating electric machine decreases, and the phase voltage crest value of the rotating electric machine decreases, whereby the modulation factor decreases. Meanwhile, if the current advance angle is decreased, the magnetic flux of the rotating electric machine increases, and the phase voltage crest value of the rotating electric machine increases, whereby the modulation factor increases. Therefore, in the case of decreasing the modulation factor in a state of maintaining the same torque, control only has to be performed so as to increase the current amplitude and the current advance angle as shown in FIG. 11. Meanwhile, in the case of increasing the modulation factor in the state of maintaining the same torque, control only has to be performed so as to decrease the current amplitude and the current advance angle as shown in FIG. 12.

Figure 13:
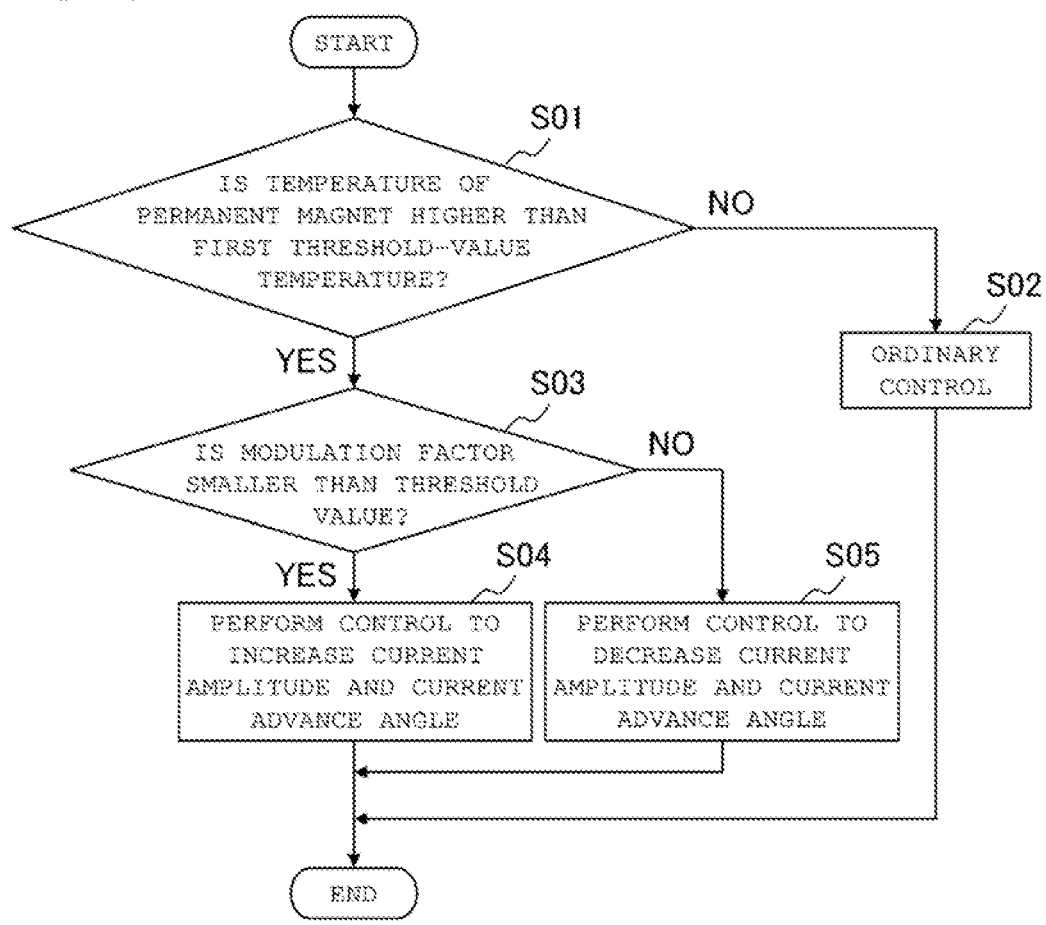
FIG. 13 is a flowchart showing a drive method to be performed by the drive device for the rotating electric machine according to the first embodiment.

FIG. 13 is a flowchart showing a drive method to be performed by the drive device for the rotating electric machine according to the present embodiment. In step S01, the control unit 5 of the drive device 1 determines whether or not the temperature of the permanent magnet inputted from the temperature detection unit 80 is higher than a first threshold-value temperature. The first threshold-value temperature is set to a temperature lower than a temperature at which the permanent magnet is demagnetized. A coercivity indicating the demagnetization resistance of a permanent magnet varies depending on the material of the magnet. Thus, the first threshold-value temperature is individually set according to the material of the magnet. For example, if the permanent magnet is a neodymium magnet, the Curie temperature is about 300° C. However, in the rotating electric machine, a magnetic field in a direction opposite to the magnetization direction is applied to the permanent magnet, and thus demagnetization occurs at about 200° C. Since the first threshold-value temperature is set to a temperature lower than the temperature at which demagnetization occurs, the first threshold-value temperature is set to, for example, 150° C. in the case of a neodymium magnet. If the control unit determines in step S01 that the temperature of the permanent magnet is equal to or lower than the first threshold-value temperature (NO), the control unit 5 advances the process to step S02 and drives the rotating electric machine through the ordinary control. Here, examples of a method for the ordinary control include a method in which the current amplitude and the current advance angle are controlled such that the overall efficiency of the power conversion circuit and the rotating electric machine becomes maximum. If a speed reducer (not shown) is connected to the rotating electric machine, examples of the method for the ordinary control also include: a method in which the current amplitude and the current advance angle are controlled such that the overall efficiency of the power conversion circuit, the rotating electric machine, and the speed reducer becomes maximum; and the like. An output shaft of the rotating electric machine is connected to an input shaft of the speed reducer, and an amplified torque and a reduced rotation speed are outputted from an output shaft of the speed reducer on the basis of a speed reduction ratio. As the speed reducer, either of a speed reducer in which the input shaft and the output shaft are coaxial and a speed reducer in which the input shaft and the output shaft are parallel to each other, may be used.

If the control unit 5 determines in step S01 that the temperature of the permanent magnet is higher than the first threshold-value temperature (YES), the control unit 5 advances the process to step S03. In step S03, the control unit 5 determines whether or not the modulation factor is smaller than a threshold value. If the control unit 5 determines in step S03 that the modulation factor is smaller than the threshold value (YES), the control unit 5 advances the process to step S04 and performs control to increase the current amplitude and the current advance angle. If the control unit 5 determines in step S03 that the modulation factor is equal to or larger than the threshold value (NO), the control unit 5 advances the process to step S05 and performs control to decrease the current amplitude and the current advance angle.

Here, specifics of the control of the current amplitude and the current advance angle in step S02, step S04, and step S05 are as follows. That is, the current command generation unit 51 of the control unit 5 stores therein individual current command maps corresponding to step S02, step S04, and step S05, and the current command generation unit 51 generates a d-axis current command value $I_d^*$ and a q-axis current command value $I_q^*$ according to each of these current command maps.

The drive device for the rotating electric machine according to the present embodiment is a drive device for a rotating electric machine having a stator including stator windings for three or more phases and a rotor including a permanent magnet, the drive device including: a power conversion circuit which converts DC power inputted from a power supply and outputs a phase current to each of the stator windings; and a control unit which controls the power conversion circuit. With a phase voltage crest value relative to a voltage of the DC power being defined as a modulation factor, a threshold value is predetermined for the modulation factor. The control unit decreases a current amplitude and a current advance angle of the phase current to be outputted from the power conversion circuit, if a temperature of the permanent magnet is higher than a predetermined first threshold-value temperature and the modulation factor is larger than the threshold value, and increases the current amplitude and the current advance angle of the phase current to be outputted from the power conversion circuit, if the temperature of the permanent magnet is higher than the predetermined first threshold-value temperature and the modulation factor is smaller than the threshold value.

The drive device, for the rotating electric machine, which is thus configured can suppress increase of the temperature of the permanent magnet while maintaining the torque. In addition, since increase of the temperature of the permanent magnet can be suppressed, it is possible to decrease the amount of a contained rare earth element such as dysprosium or terbium added to the permanent magnet in order to prevent demagnetization at a high temperature. Consequently, an effect of reducing cost for the rotating electric machine is obtained.

Second Embodiment

A drive device for the rotating electric machine according to a second embodiment is different from the drive device described in the first embodiment in that the temperature of the stator winding in the rotating electric machine is inputted to the control unit. Increase in the temperature of the stator winding causes: decrease of a withstand voltage due to damage to an insulation coating; and decrease of the efficiency of the rotating electric machine due to heat loss (copper loss). Therefore, it is also necessary to suppress increase of the temperature of the stator winding.

The configuration of the drive device 1 for the rotating electric machine according to the present embodiment is similar to the configuration of the drive device for the rotating electric machine according to the first embodiment shown in FIG. 1. However, the temperature detection unit 80 can detect the temperature of the stator winding in addition to the temperature of the permanent magnet. The temperature of the stator winding can be detected by using a temperature detector such as a thermistor or a thermocouple. The temperature of the stator winding may be calculated through heat calculation in which a thermal circuit and a loss in the rotating electric machine are used, without using the temperature detector.

Figure 14:
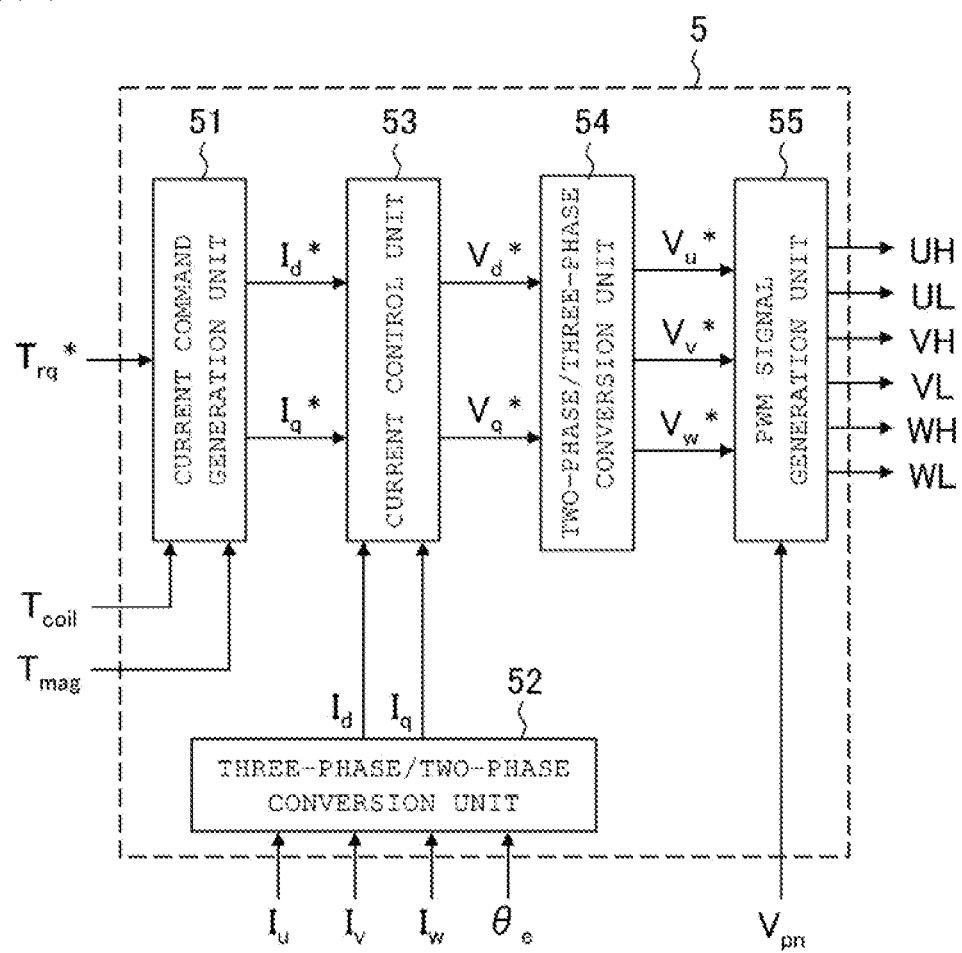
FIG. 14 is a block configuration diagram of a control unit according to a second embodiment.

FIG. 14 is a block configuration diagram of a control unit according to the present embodiment. As shown in FIG. 14, the control unit 5 in the present embodiment is composed of the current command generation unit 51, the three-phase/two-phase conversion unit 52, the current control unit 53, the two-phase/three-phase conversion unit 54, and the PWM signal generation unit 55 as is the control unit in the first embodiment. The current command generation unit 51 receives: the torque command $T_{rq}^*$ outputted from the higher-order system; and a temperature $T_{col}$ of the stator winding and the permanent magnet temperature T mag outputted from the temperature detection unit 80. The current command generation unit 51 generates a d-axis current command value $I_d^*$ and a q-axis current command value $I_q^*$ for controlling the rotating electric machine 10 through vector control.

Figure 15:
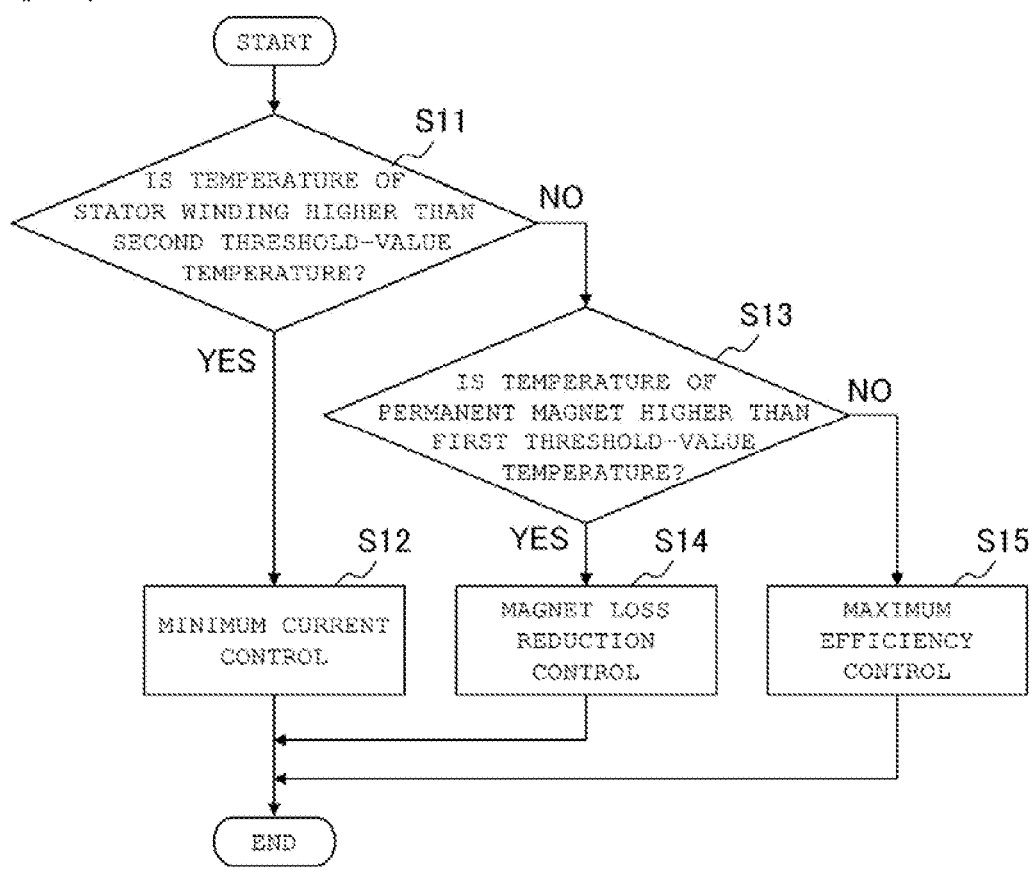
FIG. 15 is a flowchart showing a drive method to be performed by a drive device for the rotating electric machine according to the second embodiment.

FIG. 15 is a flowchart showing a drive method to be performed by the drive device for the rotating electric machine according to the present embodiment. In step S11, the control unit 5 of the drive device 1 determines whether or not the temperature of the stator winding inputted from the temperature detection unit 80 is higher than a second threshold-value temperature. The second threshold-value temperature is set on the basis of the heat-resistant temperature of a magnet wire used as the stator winding. The heat-resistant temperature of the magnet wire is dependent on the heat-resistant temperature of an insulation coating on the magnet wire. For example, if the insulation coating of the magnet wire is a polyamide-imide, the heat-resistant temperature thereof is about 200° C., and thus the second threshold-value temperature is set to, for example, 150° C. If the control unit 5 determines in step S11 that the temperature of the stator winding is higher than the second threshold-value temperature (YES), the control unit 5 advances the process to step S12 and drives the rotating electric machine through minimum current control.

If the control unit 5 determines in step S11 that the temperature of the stator winding is equal to or lower than the second threshold-value temperature (NO), the control unit 5 advances the process to step S13. In step S13, the control unit 5 determines whether or not the temperature of the permanent magnet is higher than the first threshold-value temperature. If the control unit 5 determines in step S13 that the temperature of the permanent magnet is higher than the first threshold-value temperature (YES), the control unit 5 advances the process to step S14 and drives the rotating electric machine through magnet loss reduction control. If the control unit 5 determines in step S13 that the temperature of the permanent magnet is equal to or lower than the first threshold-value temperature (NO), the control unit 5 advances the process to step S15 and drives the rotating electric machine through maximum efficiency control.

Here, the minimum current control, the magnet loss reduction control, and the maximum efficiency control will be described. The current command generation unit 51 of the control unit 5 stores therein individual current command maps corresponding to the respective types of control. The current command generation unit 51 generates a d-axis current command value $I_d^*$ and a q-axis current command value $I_q^*$ according to each of these current command maps. The individual current command maps corresponding to the respective types of control can be acquired by comprehensively analyzing the current amplitude and the current advance angle through the finite element method (FEM). Alternatively, for the current command maps, it is also possible to comprehensively acquire the current amplitude and the current advance angle by actual measurement without performing analysis through the FEM.

The minimum current control is control based on a minimum current command map in which current per torque becomes minimum. The minimum current command map for the minimum current control is a current command map obtained by selecting a combination, of current amplitude and current advance angle, that leads to minimization of the amplitude of current to be conducted through the rotating electric machine in order to obtain the same torque, by performing analysis through the FEM. The maximum efficiency control is control based on a maximum efficiency current command map in which the efficiency of the rotating electric machine becomes maximum. The maximum efficiency current command map for the maximum efficiency control is a current command map obtained by: calculating losses generated in the rotating electric machine by performing analysis through the FEM; and selecting a combination, of current amplitude and current advance angle, that leads to maximization of the efficiency of the rotating electric machine. The magnet loss reduction control is control based on a current command map for reducing more loss generated in the permanent magnet than in the maximum efficiency control. The current command map for the magnet loss reduction control is a current command map obtained by: calculating modulation factors by performing analysis through the FEM; and selecting a combination, of current amplitude and current advance angle, that corresponds to a modulation factor at which the loss in the permanent magnet becomes minimum. That is, step S14 involving the magnet loss reduction control corresponds to step S03 to step S05 in the first embodiment shown in FIG. 13.

In the drive device for the rotating electric machine according to the present embodiment, the minimum current control is performed if the temperature of the stator winding is higher than the second threshold-value temperature. By performing the minimum current control, the copper loss generated in the stator winding can be controlled to be minimized, and thus it is possible to suppress increase of the temperature of the stator winding. Meanwhile, if the temperature of the stator winding is equal to or lower than the second threshold-value temperature, the process transitions to a conditional branch at which whether or not the temperature of the permanent magnet is higher than the first threshold-value temperature is determined. If the temperature of the permanent magnet is higher than the first threshold-value temperature, the magnet loss reduction control is performed. The magnet loss reduction control is control performed in step S03 to step S05 described in the first embodiment. In the magnet loss reduction control, the current amplitude and the current advance angle are controlled according to the modulation factor so that the eddy current in the magnet is reduced, whereby it is possible to suppress increase of the temperature of the permanent magnet while maintaining the torque. If the temperature of the permanent magnet is equal to or lower than the first threshold-value temperature, the maximum efficiency control is performed. In the drive device for the rotating electric machine according to the present embodiment, the process in the flowchart shown in FIG. 15 is performed as needed at fixed time intervals during drive of the rotating electric machine. Therefore, the minimum current control, the magnet loss reduction control, and the maximum efficiency control are switched as needed correspondingly to the temperature of the stator winding and the temperature of the permanent magnet.

Figure 16:
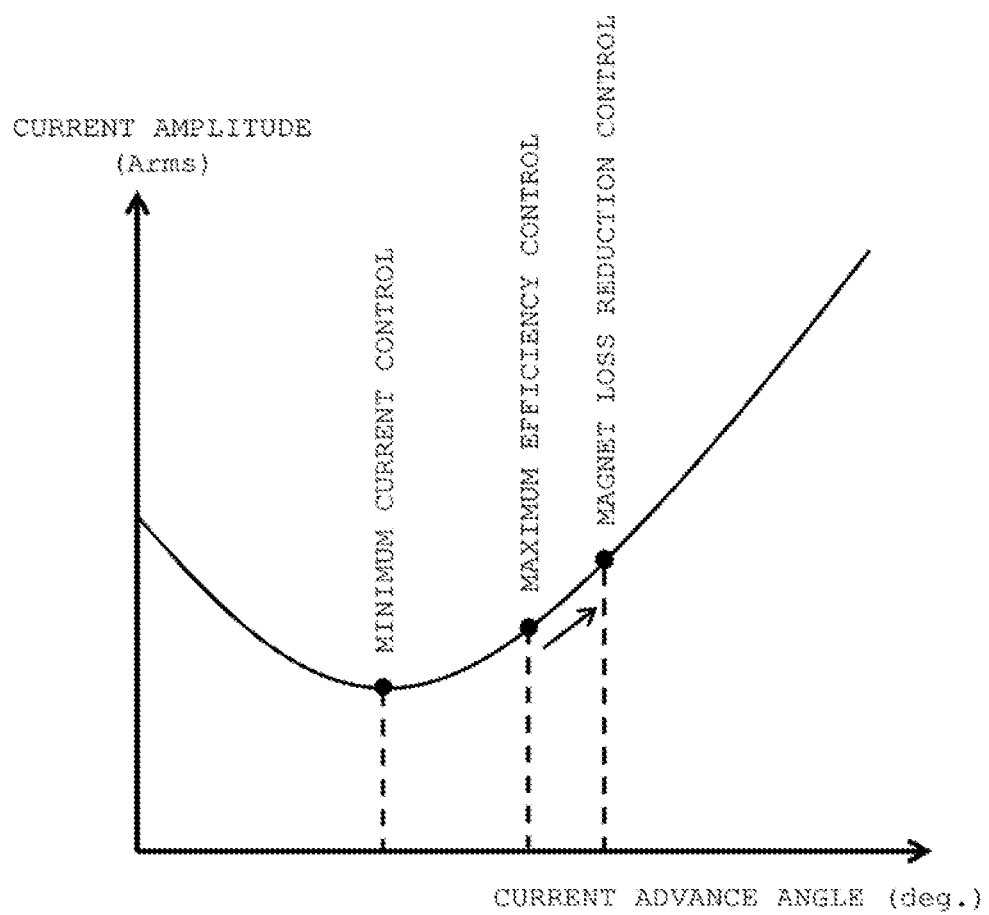
FIG. 16 is a schematic diagram showing control of the current amplitude and the current advance angle in the drive device for the rotating electric machine according to the second embodiment.
Figure 17:
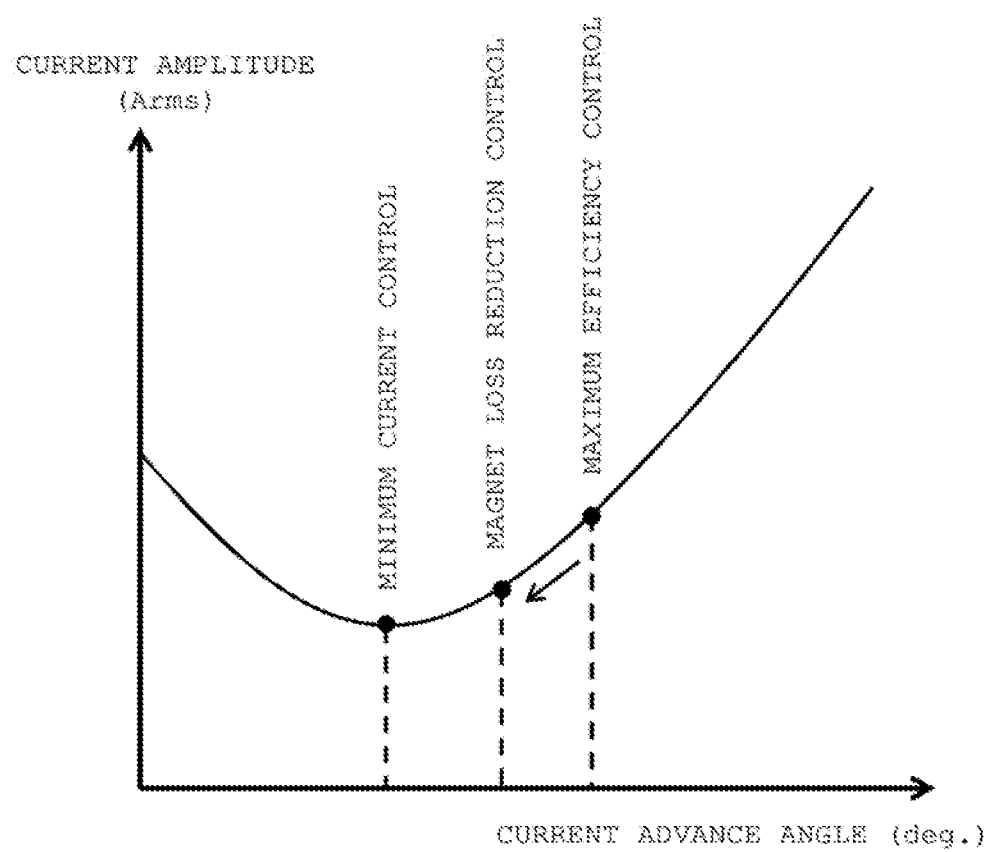
FIG. 17 is a schematic diagram showing control of the current amplitude and the current advance angle in the drive device for the rotating electric machine according to the second embodiment.

FIG. 16 is a schematic diagram showing control of the current amplitude and the current advance angle in the case of decreasing the modulation factor at the time of transition from the maximum efficiency control to the magnet loss reduction control, in the drive device for the rotating electric machine according to the present embodiment. FIG. 17 is a schematic diagram showing control of the current amplitude and the current advance angle in the case of increasing the modulation factor at the time of transition from the maximum efficiency control to the magnet loss reduction control. The current advance angle at the time of the maximum efficiency control is larger than the current advance angle at the time of the minimum current control in which the current amplitude for obtaining the same torque becomes minimum. If the current advance angle is increased, the magnetic flux to be generated in the permanent magnet decreases. Consequently, magnetic saturation is mitigated, and the magnetic flux density in the rotating electric machine also decreases, whereby iron loss decreases. Therefore, the current advance angle at the time of the maximum efficiency control is larger than the current advance angle at the time of the minimum current control. Although the relationship between each current amplitude and the corresponding current advance angle at the time of each of the maximum efficiency control, the magnet loss reduction control, and the minimum current control is indicated by a point in FIG. 16 and FIG. 17, the actual relationship between the current amplitude and the current advance angle is a region having a certain width.

If the current advance angle is increased, the magnetic flux of the rotating electric machine decreases, and the phase voltage crest value of the rotating electric machine decreases, whereby the modulation factor decreases. Meanwhile, if the current advance angle is decreased, the magnetic flux of the rotating electric machine increases, and the phase voltage crest value of the rotating electric machine increases, whereby the modulation factor increases. Therefore, in the case of decreasing the modulation factor at the time of transition from the maximum efficiency control to the magnet loss reduction control, control only has to be performed so as to increase the current amplitude and the current advance angle as shown in FIG. 16. Meanwhile, in the case of increasing the modulation factor at the time of transition from the maximum efficiency control to the magnet loss reduction control, control only has to be performed so as to decrease the current amplitude and the current advance angle as shown in FIG. 17.

Figure 18:
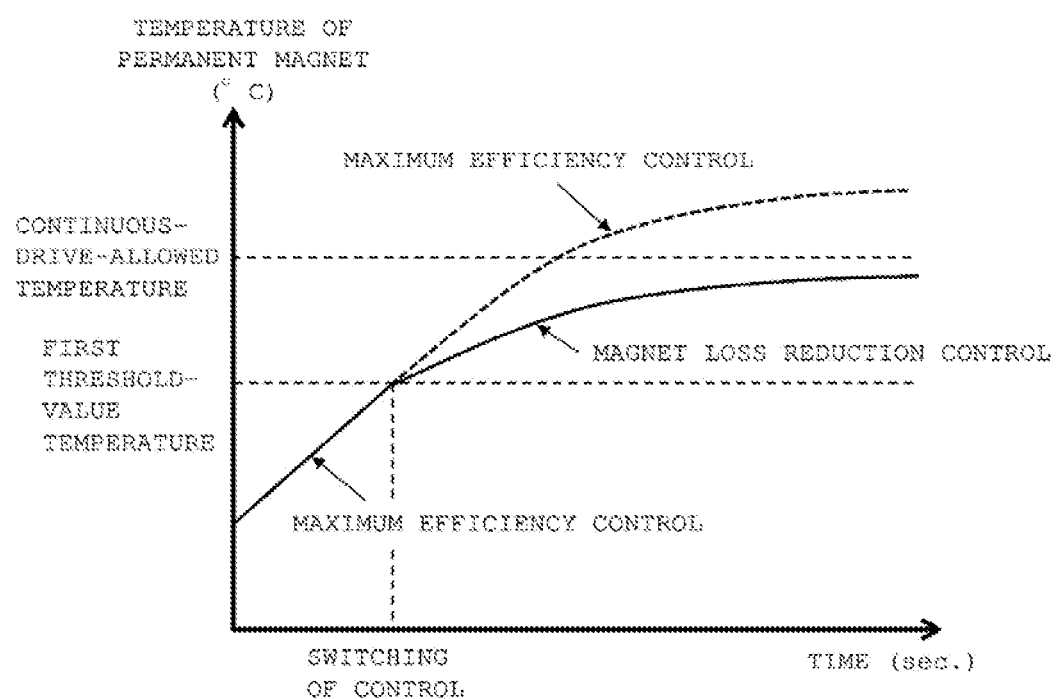
FIG. 18 is a characteristic graph showing change in the temperature of the permanent magnet in the drive device for the rotating electric machine according to the second embodiment.

FIG. 18 is a characteristic graph showing change in the permanent magnet temperature due to switching from the maximum efficiency control to the magnet loss reduction control, in the drive device for the rotating electric machine according to the present embodiment. In FIG. 18, the horizontal axis indicates time, and the vertical axis indicates the temperature of the permanent magnet. FIG. 18 shows change in the temperature of the permanent magnet in the case of performing switching to the magnet loss reduction control when the temperature of the permanent magnet reaches the first threshold-value temperature after the maximum efficiency control is started. In FIG. 18, a solid line subsequent to the switching of control indicates the temperature of the permanent magnet in the case of performing switching from the maximum efficiency control to the magnet loss reduction control. For comparison, in FIG. 18, a broken line subsequent to the switching of control indicates the temperature of the permanent magnet in the case of continuing the maximum efficiency control without performing switching from the maximum efficiency control to the magnet loss reduction control.

As shown in FIG. 18, if the rotating electric machine starts to be driven through the maximum efficiency control and the maximum efficiency control is continued even after the temperature of the permanent magnet reaches the first threshold-value temperature, the temperature of the permanent magnet exceeds a continuous-drive-allowed temperature. As a result, the permanent magnet is demagnetized, and the torque of the rotating electric machine decreases, whereby it becomes difficult to perform continuous drive. Meanwhile, in the drive device for the rotating electric machine according to the present embodiment, when the temperature of the permanent magnet reaches the first threshold-value temperature, switching from the maximum efficiency control to the magnet loss reduction control occurs, and thus increase in the temperature of the permanent magnet is moderated. Therefore, the temperature of the permanent magnet does not exceed the continuous-drive-allowed temperature, whereby continuous drive can be uninterruptedly performed. In this manner, in the drive device for the rotating electric machine according to the present embodiment, highly efficient control can be performed through the maximum efficiency control until the temperature of the permanent magnet reaches the first threshold-value temperature, and, after the temperature of the permanent magnet reaches the first threshold-value temperature, the magnet loss reduction control is performed, whereby the continuous drive time can be elongated. In a rotating electric machine applied to an electrified vehicle or the like, both highly efficient drive for improving electric mileage and long-time continuous drive are required to be achieved over wide ranges of torques and rotation speeds. The drive device for the rotating electric machine according to the present embodiment can achieve both highly efficient drive and elongation of the continuous drive time over wide ranges of torques and rotation speeds.

Third Embodiment

A drive device for the rotating electric machine according to a third embodiment is similar to the drive device described in the first embodiment. In the drive device for the rotating electric machine according to the present embodiment, the effect of reducing the eddy-current loss in the permanent magnet can be further improved by limiting the carrier frequency.

Figure 19:
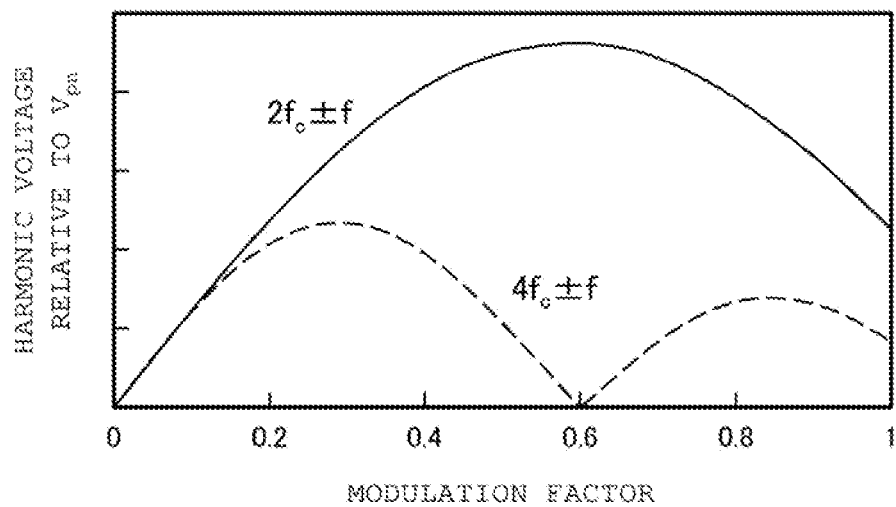
FIG. 19 is a characteristic graph showing the relationship between the modulation factor and the harmonic voltage relative to the DC busbar voltage, in a third embodiment.

FIG. 19 is a characteristic graph showing the relationship between the modulation factor and the harmonic voltage relative to the DC busbar voltage $V_{pn}$, in the drive device for the rotating electric machine according to the present embodiment. FIG. 19 shows the proportions of the amplitudes of harmonic voltages at $2f_c \pm f$ and $4f_c \pm f$ to the DC busbar voltage $V_{pn}$. As described in the first embodiment, regarding the amplitudes of the harmonic voltages, the $2f_c \pm f$ component is dominant, but the $4f_c \pm f$ component also takes large values in a range in which the modulation factor is small. In order to reduce the eddy-current loss in the permanent magnet with respect to the modulation factor on the basis of only the $2f_c \pm f$ component, an eddy-current loss based on the $4f_c \pm f$ component only has to be eliminated.

The eddy-current loss in the permanent magnet is dependent on the carrier frequency and the thickness in the magnetization direction of the permanent magnet. Here, a high-frequency component of the eddy current generated in the permanent magnet undergoes a skin effect of concentrating only on the surface of the permanent magnet, and thus the high-frequency component of the eddy current in the permanent magnet can be eliminated by setting a carrier frequency that is determined according to a skin thickness. If the frequency of the harmonic component of the magnetic flux generated from the stator winding in the rotating electric machine is $4f_c \pm f$, the frequency of a major component generated as a frequency component of the eddy current generated in the permanent magnet is $8f_c$. The $8f_c$ component of the eddy-current loss in the permanent magnet is calculated according to the sum of the products of harmonic frequencies $4f_c + f$ and $4f_c - f$ in the magnetic flux. The $8f_c$ component which is a harmonic component of the eddy-current loss in the permanent magnet is generated owing to the $4f_c \pm f$ component which is a harmonic component included in the rectangular wave phase voltage. The effect of reducing the eddy-current loss in the permanent magnet can be further obtained by setting a carrier frequency that is determined according to the skin thickness and the thickness in the magnetization direction of the permanent magnet so as to enable elimination of the $8f_c$ component of the eddy-current loss in the permanent magnet.

Figure 20:
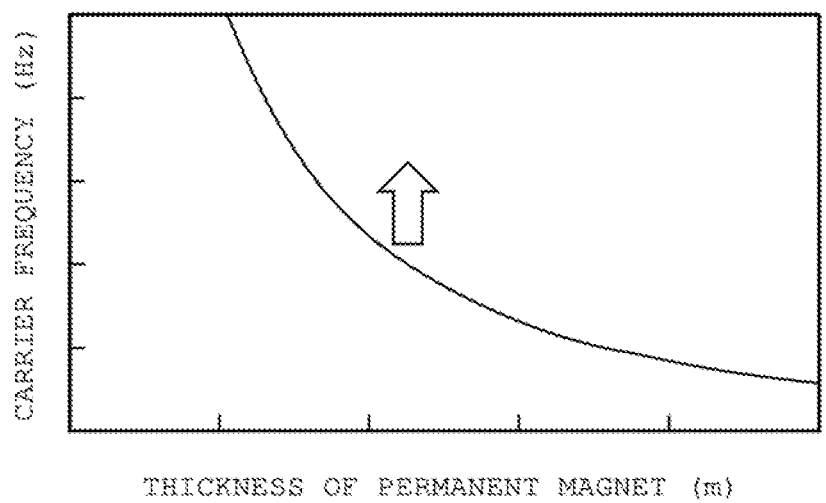
FIG. 20 shows a carrier frequency necessary for eliminating eddy-current loss in the permanent magnet with respect to the thickness of the permanent magnet, in the third embodiment.

FIG. 20 shows a carrier frequency necessary for eliminating the $8f_c$ component of the eddy-current loss in the permanent magnet with respect to the thickness of the permanent magnet, in the drive device for the rotating electric machine according to the present embodiment. The carrier frequency is defined as $f_c$ (unit: Hz), the thickness in the magnetization direction of the permanent magnet is defined as W (unit: m), the relative permeability of the permanent magnet is defined as $\mu_r$, the electrical conductivity of the permanent magnet is defined as $\sigma$ (unit: S/m), and a vacuum permeability is defined as $\mu_0$. In order to eliminate the $8f_c$ component of the eddy-current loss in the permanent magnet, the carrier frequency $f_c$ only has to be determined so as to satisfy the following expression (1).

$$f_c > 8/(\pi \times \mu_r \times \mu_0 \times \sigma \times W^2) \tag{1}$$

A line shown in FIG. 20 indicates a carrier frequency calculated on the right-hand side of expression (1). That is, setting to a carrier frequency higher than that on the line shown in FIG. 20 enables elimination of the $8f_c$ component of the eddy-current loss in the permanent magnet. When the $8f_c$ component of the eddy-current loss in the permanent magnet is eliminated, an eddy-current loss based on the $2f_c \pm f$ component of the rectangular wave phase voltage becomes dominant as the eddy-current loss in the permanent magnet, and it becomes easy to control the current amplitude and the current advance angle according to the modulation factor. In addition, elimination of the $8f_c$ component of the eddy current in the permanent magnet enables more effective reduction of the eddy-current loss in the permanent magnet.

In the drive device for the rotating electric machine according to the present embodiment, if a semiconductor switching element made of silicon carbide (SiC) is used as each of the switching elements composing the power conversion circuit, it becomes possible to set the carrier frequency to be higher. Therefore, the effect of reducing the eddy-current loss in the permanent magnet by controlling the current amplitude and the current advance angle according to the modulation factor can be more prominently obtained. In addition, a multilevel inverter is also applicable to the power conversion circuit of the drive device for the rotating electric machine described in the present embodiment. If a multilevel inverter is applied to the power conversion circuit, a harmonic component based on the carrier frequency is generated in the rectangular wave phase voltage according to the modulation factor. Thus, control of the current amplitude and the current advance angle according to the modulation factor enables suppression of increase of the temperature of the permanent magnet.

For each of the rotating electric machines described above, a water-cooling method for cooling the rotating electric machine with water or an oil-cooling method for cooling the rotating electric machine with oil may be employed. In the water-cooling method for cooling the rotating electric machine with water, the rotating electric machine is cooled by providing a water path in a frame for fixing the stator of the rotating electric machine, and thus the cooling effect for the permanent magnet of the rotor is low. Meanwhile, in the oil-cooling method for cooling the rotating electric machine with oil, oil is directly dispersed on the rotating electric machine, and thus the permanent magnet of the rotor can be directly cooled. However, oil is dispersed only on the surface of the permanent magnet, and the oil does not reach the center in the axial direction of the permanent magnet. Consequently, distribution occurs regarding the temperature of the permanent magnet. However, if the drive device for the rotating electric machine described in any of the first to third embodiments is applied, it is possible to suppress increase of the temperature of the permanent magnet of the rotor both in a rotating electric machine employing the water-cooling method and a rotating electric machine employing the oil-cooling method.

The drive device for the rotating electric machine described in any of the first to third embodiments is applicable also as a vehicle drive device for an electrified vehicle. If the drive device is applied as a vehicle drive device, decrease in torque does not occur because demagnetization of the permanent magnet in the rotating electric machine is prevented, whereby continuous drive can be realized without decreasing the acceleration of the vehicle.

Figure 21:
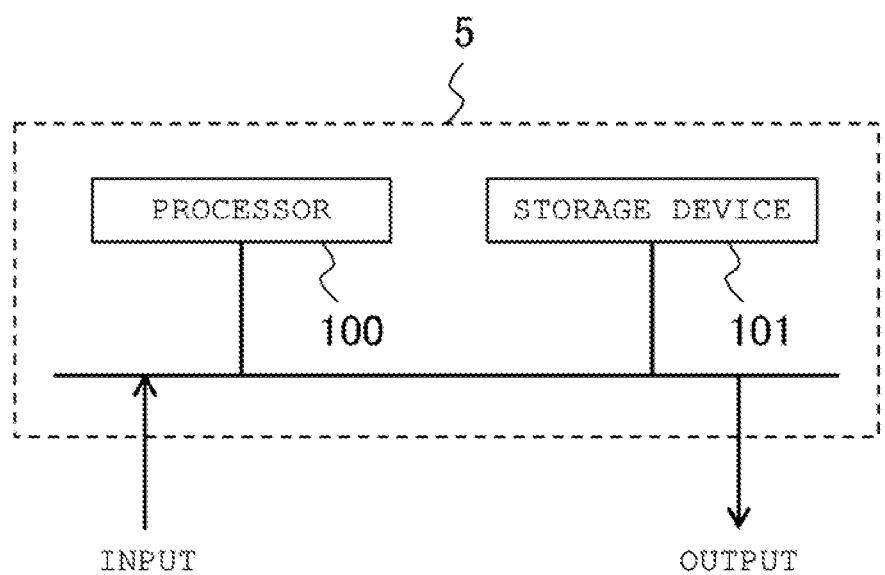
FIG. 21 shows a hardware configuration for realizing the control unit in each of drive devices for the rotating electric machine according to the first to third embodiments.

It is noted that the control unit 5 is composed of a processor 100 and a storage device 101, an example of hardware of the control unit 5 being shown in FIG. 21. Although not shown, the storage device includes a volatile storage device such as a random access memory and a nonvolatile auxiliary storage device such as a flash memory. Alternatively, the storage device may include, as the auxiliary storage device, a hard disk instead of a flash memory. The processor 100 executes a program inputted from the storage device 101. In this case, the program is inputted from the auxiliary storage device via the volatile storage device to the processor 100. Further, the processor 100 may output data such as a computation result to the volatile storage device of the storage device 101 or may save the data via the volatile storage device into the auxiliary storage device.

Although the disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the specification of the present disclosure. For example, at least one of the constituent components may be modified, added, or eliminated. At least one of the constituent components mentioned in at least one of the preferred embodiments may be selected and combined with the constituent components mentioned in another preferred embodiment.

Hereinafter, modes of the present disclosure are summarized as additional notes.

Additional Note 1

A drive device for a rotating electric machine having a stator including stator windings for three or more phases and a rotor including a permanent magnet, the drive device including:

a power conversion circuit which converts DC power inputted from a power supply and outputs a phase current to each of the stator windings; and a control unit which controls the power conversion circuit, wherein with a phase voltage crest value relative to a voltage of the DC power being defined as a modulation factor, a threshold value is predetermined for the modulation factor, and the control unit decreases a current amplitude and a current advance angle of the phase current to be outputted from the power conversion circuit, if a temperature of the permanent magnet is higher than a predetermined first threshold-value temperature and the modulation factor is larger than the threshold value, and increases the current amplitude and the current advance angle of the phase current to be outputted from the power conversion circuit, if the temperature of the permanent magnet is higher than the first threshold-value temperature and the modulation factor is smaller than the threshold value.

Additional Note 2

The drive device for the rotating electric machine, according to additional note 1, wherein
    the threshold value predetermined for the modulation factor is 0.6.

Additional Note 3

The drive device for the rotating electric machine, according to additional note 1 or 2, wherein
    the control unit stores therein a maximum efficiency current command map in which an efficiency of the rotating electric machine becomes maximum and a minimum current command map in which a current per torque of the rotating electric machine becomes minimum, and the control unit controls the rotating electric machine on the basis of the minimum current command map if a temperature of the stator winding is higher than a predetermined second threshold-value temperature, and controls the rotating electric machine on the basis of the maximum efficiency current command map if the temperature of the stator winding is equal to or lower than the second threshold-value temperature and the temperature of the permanent magnet is equal to or lower than the first threshold-value temperature.

Additional Note 4

The drive device for the rotating electric machine, according to any one of additional notes 1 to 3, wherein if a carrier frequency with which the control unit controls the power conversion circuit is defined as $f_c$ (unit: Hz), a thickness in a magnetization direction of the permanent magnet is defined as W (unit: m), a relative permeability of the permanent magnet is defined as $\mu_r$, an electrical conductivity of the permanent magnet is defined as σ (unit: S/m), and a vacuum permeability is defined as $\mu_0$, the carrier frequency satisfies $$f_c > 8/(\pi \times \mu_r \times \mu_0 \times \sigma \times W^2).$$

Additional Note 5

The drive device for the rotating electric machine, according to any one of additional notes 1 to 4, wherein the power conversion circuit is an inverter circuit in which six semiconductor switching elements each made of silicon carbide are connected in a full-bridge configuration.

Additional Note 6

The drive device for the rotating electric machine, according to any one of additional notes 1 to 5, the rotating electric machine being such that a plurality of the permanent magnets are arranged in two or more layers each having a V shape toward a circumferentially outer side, to form one magnetic pole.

Additional Note 7

A drive method for a rotating electric machine having a stator including stator windings for three or more phases and a rotor including a permanent magnet, the drive method being for converting DC power inputted from a power supply and outputting a phase current to each of the stator windings, wherein with a phase voltage crest value relative to a voltage of the DC power being defined as a modulation factor, a threshold value is predetermined for the modulation factor, the drive method including:

decreasing a current amplitude and a current advance angle of the phase current if a temperature of the permanent magnet is higher than a predetermined first threshold-value temperature and the modulation factor is larger than the threshold value; and increasing the current amplitude and the current advance angle of the phase current if the temperature of the permanent magnet is higher than the first threshold-value temperature and the modulation factor is smaller than the threshold value.

DESCRIPTION OF THE REFERENCE CHARACTERS 1 drive device
1a, 1b DC busbar
2 capacitor
2a AC busbar
3 power conversion circuit
4 current detection unit
4a shunt resistor
5 control unit
6 voltage detection unit
10 rotating electric machine
11 input terminal
12 output terminal
20 stator
21 stator core
22 stator winding
23 core back
24 tooth
31 to 36 switching element
40 rotor
41 rotor core
42 permanent magnet
43 magnet insertion hole
50 rotation shaft
51 current command generation unit
52 three-phase/two-phase conversion unit
53 current control unit
54 two-phase/three-phase conversion unit
55 PWM signal generation unit
60 rotation angle sensor
70 power switch
80 temperature detection unit
90 DC power supply
100 processor
101 storage device

What is claimed is:

1. A drive device for a rotating electric machine having a stator including stator windings for three or more phases and a rotor including a permanent magnet, the drive device comprising:

a power conversion circuit which converts DC power inputted from a power supply and outputs a phase current to each of the stator windings; and a control circuitry which controls the power conversion circuit, wherein with a phase voltage crest value relative to a voltage of the DC power being defined as a modulation factor, a threshold value is predetermined for the modulation factor, and the control circuitry decreases a current amplitude and a current advance angle of the phase current to be outputted from the power conversion circuit, if a temperature of the permanent magnet is higher than a predetermined first threshold-value temperature and the modulation factor is larger than the threshold value, and increases the current amplitude and the current advance angle of the phase current to be outputted from the power conversion circuit, if the temperature of the permanent magnet is higher than the first threshold-value temperature and the modulation factor is smaller than the threshold value.

2. The drive device for the rotating electric machine, according to claim 1, wherein
the threshold value predetermined for the modulation factor is 0.6.

3. The drive device for the rotating electric machine, according to claim 2, wherein
the control circuitry stores therein
a maximum efficiency current command map in which an efficiency of the rotating electric machine becomes maximum and
a minimum current command map in which a current per torque of the rotating electric machine becomes minimum, and
the control circuitry
controls the rotating electric machine on the basis of the minimum current command map if a temperature of the stator winding is higher than a predetermined second threshold-value temperature, and
controls the rotating electric machine on the basis of the maximum efficiency current command map if the temperature of the stator winding is equal to or lower than the second threshold-value temperature and the temperature of the permanent magnet is equal to or lower than the first threshold-value temperature.

4. The drive device for the rotating electric machine, according to claim 2, wherein
if a carrier frequency with which the control circuitry controls the power conversion circuit is defined as $f_c$ (unit: Hz), a thickness in a magnetization direction of the permanent magnet is defined as W (unit: m), a relative permeability of the permanent magnet is defined as $\mu_r$, an electrical conductivity of the permanent magnet is defined as $\sigma$ (unit: S/m), and a vacuum permeability is defined as $\mu_0$, the carrier frequency satisfies $f_c > 8/(\pi \times \mu_r \times \mu_0 \times \sigma \times W^2)$.

5. The drive device for the rotating electric machine, according to claim 2, wherein
the power conversion circuit is an inverter circuit in which six semiconductor switching elements each made of silicon carbide are connected in a full-bridge configuration.

6. The drive device for the rotating electric machine, according to claim 2, the rotating electric machine being such that a plurality of the permanent magnets are arranged in two or more layers each having a V shape toward a circumferentially outer side, to form one magnetic pole.

7. The drive device for the rotating electric machine, according to claim 1, wherein
the control circuitry stores therein
a maximum efficiency current command map in which an efficiency of the rotating electric machine becomes maximum and
a minimum current command map in which a current per torque of the rotating electric machine becomes minimum, and
the control circuitry
controls the rotating electric machine on the basis of the minimum current command map if a temperature of the stator winding is higher than a predetermined second threshold-value temperature, and
controls the rotating electric machine on the basis of the maximum efficiency current command map if the temperature of the stator winding is equal to or lower than the second threshold-value temperature and the temperature of the permanent magnet is equal to or lower than the first threshold-value temperature.

8. The drive device for the rotating electric machine, according to claim 1, wherein
if a carrier frequency with which the control circuitry controls the power conversion circuit is defined as $f_c$ (unit: Hz), a thickness in a magnetization direction of the permanent magnet is defined as W (unit: m), a relative permeability of the permanent magnet is defined as $\mu_r$, an electrical conductivity of the permanent magnet is defined as $\sigma$ (unit: S/m), and a vacuum permeability is defined as $\mu_0$, the carrier frequency satisfies $f_c > 8/(\pi \times \mu_r \times \mu_0 \times \sigma \times W^2)$.

9. The drive device for the rotating electric machine, according to claim 1, wherein
the power conversion circuit is an inverter circuit in which six semiconductor switching elements each made of silicon carbide are connected in a full-bridge configuration.

10. The drive device for the rotating electric machine, according to claim 1, the rotating electric machine being such that a plurality of the permanent magnets are arranged in two or more layers each having a V shape toward a circumferentially outer side, to form one magnetic pole.

11. A drive method for a rotating electric machine having a stator including stator windings for three or more phases and a rotor including a permanent magnet, the drive method being for converting DC power inputted from a power supply and outputting a phase current to each of the stator windings, wherein
with a phase voltage crest value relative to a voltage of the DC power being defined as a modulation factor, a threshold value is predetermined for the modulation factor,
the drive method comprising:
decreasing a current amplitude and a current advance angle of the phase current if a temperature of the permanent magnet is higher than a predetermined first threshold-value temperature and the modulation factor is larger than the threshold value; and
increasing the current amplitude and the current advance angle of the phase current if the temperature of the permanent magnet is higher than the first threshold-value temperature and the modulation factor is smaller than the threshold value.

* * * * *